US 10,545,369 B2

(12) United States Patent
Park et al.

(10) Patent No.: US 10,545,369 B2
(45) Date of Patent: Jan. 28, 2020

(54) DISPLAY DEVICE

(71) Applicant: Samsung Display Co., Ltd., Yongin-si, Gyeonggi-do (KR)

(72) Inventors: Seunghyun Park, Seoul (KR); Junho Song, Seongnam-si (KR)

(73) Assignee: Samsung Display Co., Ltd. (KR)

(*) Notice: Subject to any disclaimer, the term of this patent is extended or adjusted under 35 U.S.C. 154(b) by 61 days.

(21) Appl. No.: 15/878,556

(22) Filed: Jan. 24, 2018

(65) Prior Publication Data

US 2019/0011773 A1 Jan. 10, 2019

(30) Foreign Application Priority Data

Jul. 4, 2017 (KR) .................. 10-2017-0085059

(51) Int. Cl.
*G02F 1/1335* (2006.01)
*G02F 1/13363* (2006.01)
*G02F 1/1337* (2006.01)
*G02F 1/1343* (2006.01)

(52) U.S. Cl.
CPC .... *G02F 1/133528* (2013.01); *G02F 1/13363* (2013.01); *G02F 1/133514* (2013.01); *G02F 1/133553* (2013.01); *G02F 1/133784* (2013.01); *G02F 1/134309* (2013.01); *G02F 2001/133531* (2013.01); *G02F 2001/133638* (2013.01); *G02F 2201/123* (2013.01); *G02F 2413/02* (2013.01); *G02F 2413/06* (2013.01)

(58) Field of Classification Search
CPC .................................................. G02F 1/1335
See application file for complete search history.

(56) References Cited

U.S. PATENT DOCUMENTS

| 5,619,356 | A | 4/1997 | Kozo et al. |
| 6,697,134 | B2 | 2/2004 | Watanabe et al. |
| 8,314,918 | B2 | 11/2012 | Kean et al. |
| 9,454,035 | B2 | 9/2016 | Tamaki |

(Continued)

FOREIGN PATENT DOCUMENTS

| GB | 2427033 A | 12/2006 |
| JP | 4658147 | 3/2011 |

(Continued)

OTHER PUBLICATIONS

Partial European Search report for EP Application No. 18173671.1 dated Oct. 5, 2018.

*Primary Examiner* — Sang V Nguyen
(74) *Attorney, Agent, or Firm* — Innovation Counsel LLP

(57) ABSTRACT

A display device includes a liquid crystal display panel including a first substrate, a second substrate facing the first substrate and including a reflective layer, and a liquid crystal layer disposed between the first and second substrates, a light control member disposed on the liquid crystal display panel and including a first optical part, and a polarizing member disposed on the light control member and including a polarizer. The liquid crystal layer includes a first liquid crystal molecule adjacent to the first substrate, and a long axis of the first liquid crystal molecule projected on the first substrate is aligned in a first direction. An extending direction of a long axis of the first optical part projected on the first substrate is parallel to the first direction, and the polarizer has a transmission axis extending in a second direction.

22 Claims, 17 Drawing Sheets

(56) References Cited

U.S. PATENT DOCUMENTS

| | | | |
|---|---|---|---|
| 9,645,443 B2 | 5/2017 | Fukunaga et al. | |
| 2007/0085948 A1* | 4/2007 | Kim | G02F 1/133632 |
| | | | 349/114 |
| 2007/0252931 A1* | 11/2007 | Wu | G02F 1/133555 |
| | | | 349/114 |
| 2009/0128746 A1* | 5/2009 | Kean | G02F 1/1323 |
| | | | 349/96 |
| 2013/0286307 A1* | 10/2013 | Nishida | G02F 1/133555 |
| | | | 349/33 |
| 2014/0125933 A1* | 5/2014 | Tamaki | G02F 1/133555 |
| | | | 349/114 |
| 2014/0198287 A1* | 7/2014 | Tamaki | G02F 1/133504 |
| | | | 349/112 |
| 2014/0293189 A1* | 10/2014 | Fukunaga | G02B 6/0038 |
| | | | 349/65 |
| 2015/0369960 A1* | 12/2015 | Yoshida | G02B 1/14 |
| | | | 349/96 |
| 2017/0123248 A1* | 5/2017 | Ro | G02F 1/133345 |

FOREIGN PATENT DOCUMENTS

| | | |
|---|---|---|
| KR | 100149744 | 10/1998 |
| KR | 100446321 | 8/2004 |
| KR | 101544275 | 8/2015 |

\* cited by examiner

DISPLAY DEVICE

CROSS-REFERENCE TO RELATED APPLICATION

This application claims priority to Korean Patent Application No. 10-2017-0085059, filed on Jul. 4, 2017, and all the benefits accruing therefrom under 35 U.S.C. § 119, the disclosure of which is herein incorporated by reference in its entirety.

BACKGROUND

1. Field

Embodiments of the present disclosure relate to a display device and, more particularly, to a reflective liquid crystal display device capable of achieving improved contrast ratio and color reproducibility by controlling or adjusting relation between an optical axis of a light control member and an alignment direction of a liquid crystal molecule.

2. Description of the Related Art

Various kinds of display devices are used to provide image information. Liquid crystal display devices are commonly used as large display devices and portable display devices because of their low power consumption characteristics. Examples of the liquid crystal display devices include a transmissive liquid crystal display device, a reflective liquid crystal display device, and a transflective liquid crystal display device. The reflective liquid crystal display device displays an image using external light (e.g., the light of the Sun or an indoor light) as a light source or using a light source member disposed on a liquid crystal display panel.

In particular, the reflective or transflective liquid crystal display device may suffer from changes of a contrast ratio and a degree of color reproducibility according to an alignment direction of liquid crystal molecules and a direction of an optical axis of a light source member due to optical anisotropy of the liquid crystal molecules.

SUMMARY

Embodiments of the present disclosure may provide a display device having a high contrast ratio and high color reproducibility when the display device displays an image in a reflection mode.

Embodiments of the present disclosure may also provide a display device capable of improving display quality of a displayed image using external light by optimizing an alignment direction of liquid crystal molecules and alignment of an optical axis of a light control member and a transmission axis of a polarizer.

In an aspect of the present disclosure, a display device includes a liquid crystal display panel including a first substrate, a second substrate facing the first substrate and including a reflective layer, and a liquid crystal layer disposed between the first substrate and the second substrate, a light control member disposed on the liquid crystal display panel and including a first optical part, and a polarizing member disposed on the light control member and including a polarizer. The liquid crystal layer includes a first liquid crystal molecule adjacent to the first substrate, and a long axis of the first liquid crystal molecule projected on the first substrate is aligned in a first direction. An extending direction of a long axis of the first optical part projected on the first substrate is parallel to the first direction, and the polarizer has a transmission axis extending in a second direction.

The second direction may be perpendicular to the first direction.

The second direction may be parallel to the first direction.

The second direction may be parallel to a horizontal direction of the liquid crystal display panel when viewed in a plan view, and the first direction may be perpendicular to the second direction.

The second direction may be perpendicular to a horizontal direction of the liquid crystal display panel when viewed in a plan view, and the first direction may be parallel to the second direction.

The polarizing member may further include a half-wave retardation layer disposed under the polarizer, and a quarter-wave retardation layer disposed under the half-wave retardation layer.

An angle between a first optical axis of the half-wave retardation layer and a second optical axis of the quarter-wave retardation layer may be 60°±5°.

An angle between the transmission axis and a first optical axis of the half-wave retardation layer may be 15°±5°, and an angle between the transmission axis and a second optical axis of the quarter-wave retardation layer may be 75°±5°.

The light control member may further include a plurality of first optical parts having a first refractive index, and a second optical part having a second refractive index that is lower than the first refractive index and filling a space between the plurality of first optical parts.

The light control member may further include an auxiliary light control member disposed adjacent to the polarizing member, and the auxiliary light control member may include an auxiliary optical part, and an extending direction of a long axis of the auxiliary optical part is parallel to a normal direction of a display surface of the liquid crystal display panel.

The display device may further include a first alignment layer disposed between the first substrate and the liquid crystal layer. A rubbing direction of the first alignment layer may be parallel to the first direction.

The rubbing direction of the first alignment layer may be parallel or perpendicular to the second direction.

The second substrate may further include a pixel electrode including a stem portion and a plurality of branch portions protruding and extending from the trunk portion. An extending direction of the plurality of branch portions may be parallel to the first direction.

The extending direction of the plurality of branch portions may be parallel or perpendicular to the second direction.

The liquid crystal layer may further include a second liquid crystal molecule disposed adjacent to the second substrate. An angle between the first direction and an alignment direction of a long axis of the second liquid crystal molecule that is projected on the second substrate may range from 60 degrees to 90 degrees.

The first substrate may include a color filter layer.

The second substrate may further include a color filter layer disposed on the reflective layer.

In another aspect of the present disclosure, a display device includes a liquid crystal display panel including a first substrate, a second substrate facing the first substrate and including a reflective layer, and a liquid crystal layer disposed between the first substrate and the second substrate, a light control member disposed on the liquid crystal display panel and including a first optical part, a polarizing member disposed on the light control member and including a polarizer. The liquid crystal layer includes a liquid crystal molecule adjacent to the first substrate, and a long axis of the liquid crystal molecule that is projected on the first substrate is aligned in a first direction. A long axis of the first optical part projected on the first substrate is parallel to the first direction, and the polarizer has a transmission axis extending in a second direction that is parallel or perpendicular to the first direction.

The second direction may be parallel to a horizontal direction of a display surface of the liquid crystal display panel when viewed in a plan view.

The first direction may be perpendicular to the second direction.

In still another aspect of the present disclosure, a display device includes a reflective liquid crystal display panel including an upper substrate and a lower substrate facing each other and a liquid crystal layer disposed between the upper substrate and the lower substrate, a light control member disposed on the reflective liquid crystal display panel and including a rod, and a polarizing member disposed on the light control member and including a polarizer. The liquid crystal layer includes a liquid crystal molecule being adjacent to the upper substrate and having a first azimuth. The rod has a second azimuth, and a direction of the second azimuth is parallel to a direction of the first azimuth, and the polarizer has a transmission axis extending in a direction perpendicular to the direction of the first azimuth.

The second azimuth may be equal to the first azimuth.

BRIEF DESCRIPTION OF THE DRAWINGS

The above and other aspects and features of the present disclosure will become more apparent by describing in further detail exemplary embodiments thereof with reference to the accompanying drawings, in which.

DETAILED DESCRIPTION OF THE EMBODIMENTS

Figure 1:
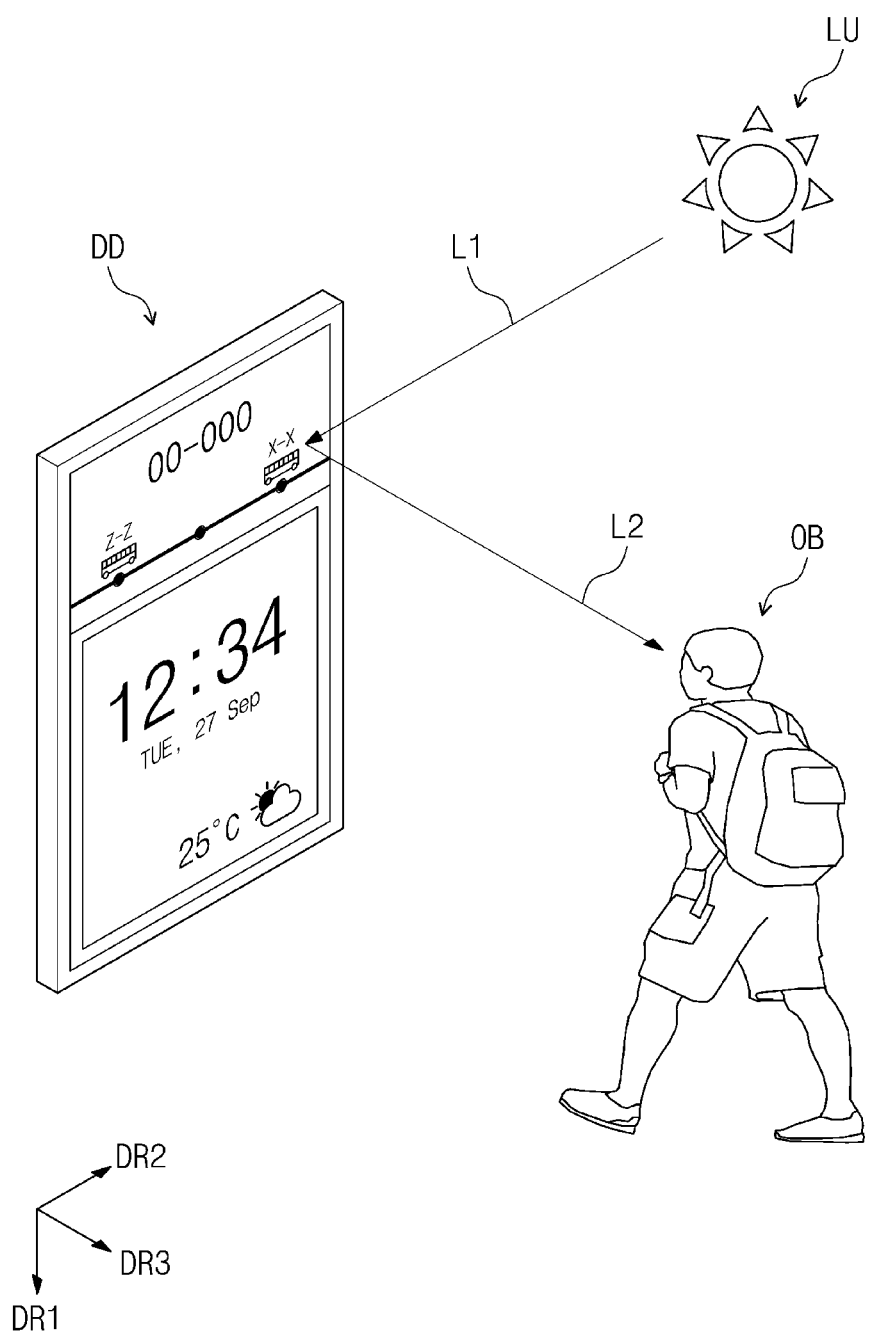
FIG. 1 is a view illustrating an example of use of a display device according to an embodiment of the present disclosure.

The present disclosure now will be described more fully hereinafter with reference to the accompanying drawings, in which various embodiments are shown. The present disclosure may, however, be embodied in many different forms, and should not be construed as limited to the embodiments set forth herein. Rather, these embodiments are provided so that the present disclosure will be thorough and complete, and will fully convey the scope of the inventive concept of the present disclosure to those skilled in the art. Like reference numerals refer to like elements throughout.

It will be understood that when an element such as a layer, region or substrate is referred to as being "on" another element, it can be directly on the other element or one or more intervening elements may be present. In contrast, the term "directly" may mean that there may be no intervening elements. In addition, it will also be understood that when a plate is referred to as being disposed "on" another part, it can be disposed above or beneath another part. As used herein, the term "and/or" may include any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" may mean "and/or." As used herein, the term "and/or" may include any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations), and the spatially relative descriptors used herein are interpreted accordingly. It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings herein. "About" or "approximately" as used herein is inclusive of the stated value and may mean within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions may be exaggerated for clarity. Accordingly, variations from the shapes of the illustrations as a result, for example, of manufacturing techniques and/or tolerances, are to be expected. Thus, exemplary embodiments should not be construed as limited to the shapes and sizes of regions illustrated herein but are to include deviations in shapes and sizes that result, for example, from manufacturing. For example, an etching region illustrated as a rectangle can have rounded or curved features. Thus, the regions illustrated in the figures are schematic in nature, and their shapes and sizes are not intended to illustrate the actual shape and size of a region of a device and are not intended to limit the scope of exemplary embodiments.

Hereinafter, exemplary embodiments of the present disclosure will be described in detail with reference to the accompanying drawings.

FIG. 1 illustrates an example in which a display device DD according to an embodiment is used. In FIG. 1, the display device DD according to an embodiment may generate an image using light provided from an external light source LU and may provide the generated image to a user OB. For example, the display device DD may be used as a public information display (PID) device.

The display device DD according to an embodiment may be a reflective or transflective display device that displays an image using the external light source LU. The external light source LU may be the light of the Sun or may be an external illuminator disposed in a space in which the display device DD is disposed. The light source LU provides light L1 to the display device DD, and the provided light L1 is reflected by a reflective layer of the display device DD to display an image. Light L2 (e.g., the image) outputted from the display device DD is provided to the user OB.

Although FIG. 1 illustrates the display device DD used as the PID device, embodiments of the present disclosure are not limited thereto. In certain embodiments, the display device DD may be used as a portable display device.

In FIG. 1, first to third directional axes DR1 to DR3 are illustrated to represent relative positions of the display device DD, the light source LU, and the user OB. In FIG. 1, a direction of the third directional axis DR3 may be defined as a direction in which an image displayed by the display device DD is provided to the user OB. The first directional axis DR1 and the second directional axis DR2 may be perpendicular to each other, and the third directional axis DR3 may be a normal direction with respect to a plane defined by the first directional axis DR1 and the second directional axis DR2. For example, in FIG. 1, a direction of the first directional axis DR1 may be a vertical direction of the display device DD, and a direction of the second directional axis DR2 may be a horizontal direction of the display device DD.

Figure 2:
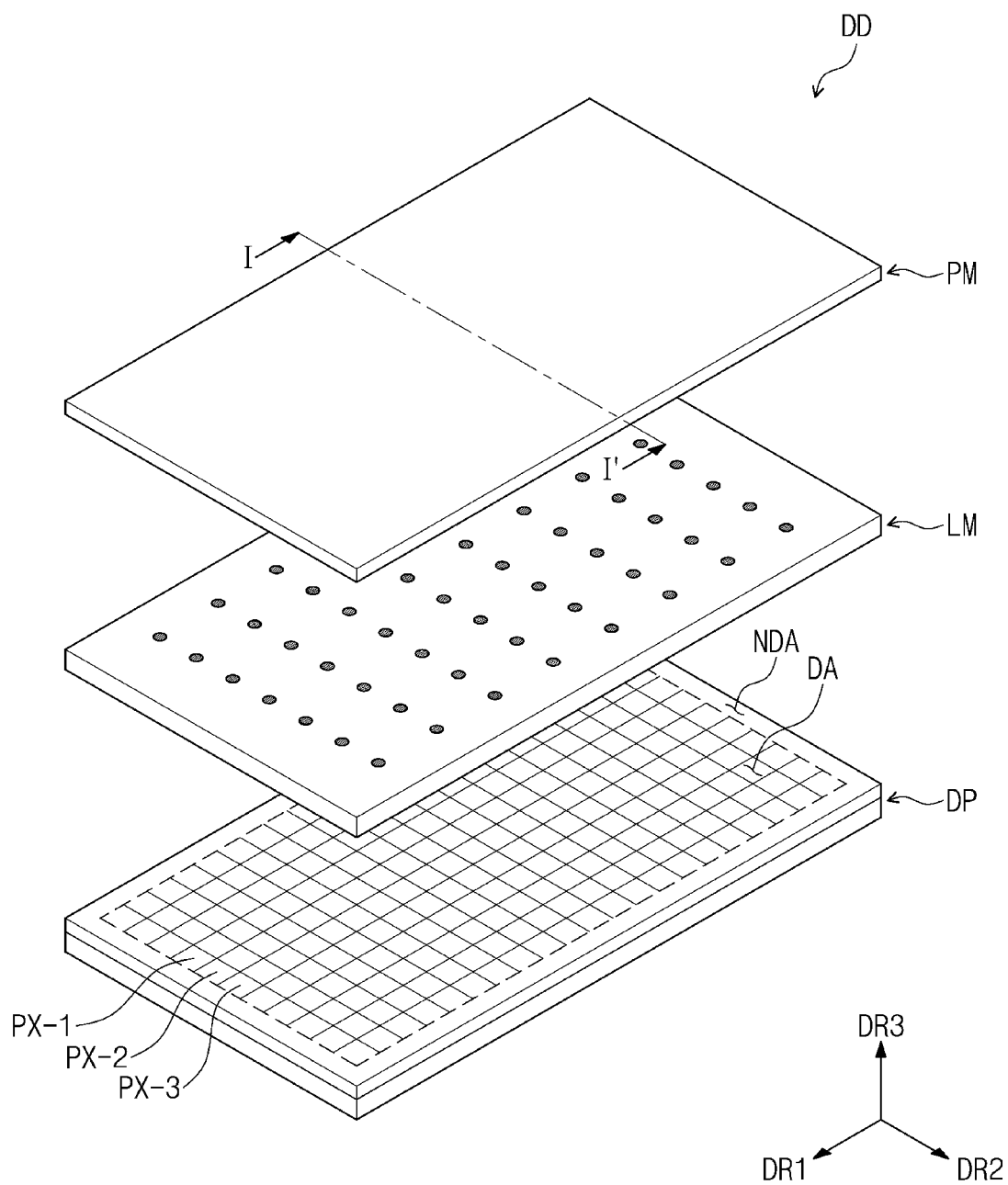
FIG. 2 is an exploded perspective view illustrating a display device according to an embodiment of the present disclosure.
Figure 3:
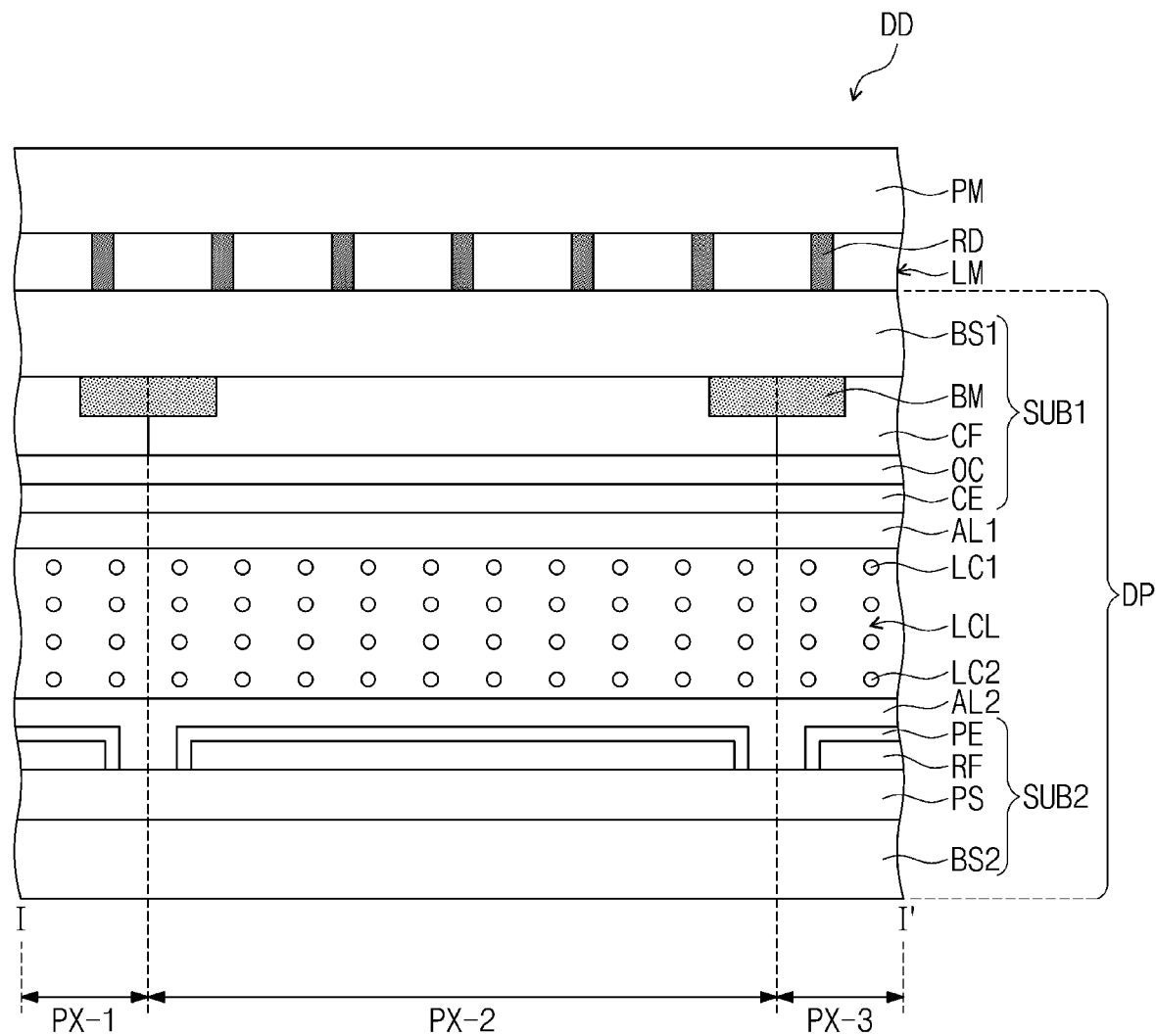
FIG. 3 is a cross-sectional view illustrating a display device according to an embodiment of the present disclosure.

FIG. 2 is an exploded perspective view illustrating the display device DD according to an embodiment of the present disclosure. FIG. 3 is a cross-sectional view corresponding to a line I-I' of the display device DD illustrated in FIG. 2. The display device DD according to an embodiment may include a liquid crystal display panel DP, a light control member LM disposed on the liquid crystal display panel DP, and a polarizing member PM. The liquid crystal display panel DP, the light control member LM, and the polarizing member PM may be sequentially stacked in the direction of the third directional axis DR3 that corresponds to the direction in which an image is displayed.

The liquid crystal display panel DP may include a display area DA displaying an image and a non-display area NDA not displaying an image. The non-display area NDA may be disposed around the display area DA.

The liquid crystal display panel DP may have a quadrilateral shape parallel to a plane defined by the first directional axis DR1 and the second directional axis DR2. However, embodiments of the present disclosure are not limited thereto. In certain embodiments, a shape of the display area DA and a shape of the non-display area NDA may be relatively and variously designed. The liquid crystal display panel DP may generate an image and may provide the generated image through a front surface thereof. The liquid crystal display panel DP may provide the generated image in the direction of the third directional axis DR3.

In an embodiment, the display area DA of the liquid crystal display panel DP may include a plurality of pixel areas PX-1, PX-2, and PX-3. The pixel areas PX-1, PX-2, and PX-3 may be defined by, for example, a plurality of gate lines and a plurality of data lines. The pixel areas PX-1, PX-2, and PX-3 may be arranged in a matrix form. A pixel PX (see FIG. 4A) may be disposed in each of the pixel areas PX-1, PX-2, and PX-3.

In the liquid crystal display panel DP, the pixel areas PX-1, PX-2, and PX-3 may emit or output lights of which wavelengths are different from each other. For example, in an embodiment, the liquid crystal display panel DP may include a blue pixel area, a green pixel area, a red pixel area, and a white pixel area. However, embodiments of the present disclosure are not limited thereto. In certain embodiments, the pixel areas may emit or output lights of which wavelengths are different from those of the color lights described above, or neighboring pixel areas may emit or output the same wavelength of light.

The light control member LM may be disposed on the liquid crystal display panel DP. The light control member LM may include a first optical part RD. The first optical part RD may have a rod shape. The light control member LM may be an optical layer that transmits light provided through the polarizing member PM to the liquid crystal display panel DP and transmits light outputted from the liquid crystal display panel DP to the polarizing member PM. For example, the light control member LM may function as a light-scattering layer or a light-collecting layer. In more detail, the light control member LM may collect light outputted from the liquid crystal display panel DP in the direction of the third directional axis DR3. The direction of the third directional axis DR3 may also be referred to as a front direction that corresponds to a direction in which an image displayed by the display device DD is outputted to the user OB.

The polarizing member PM may be disposed on the light control member LM. The polarizing member PM may include a polarizer that linearly polarizes light provided thereto. The light control member LM and the polarizing member PM will be described later in more detail.

The liquid crystal display panel DP may include a first substrate SUB1, a second substrate SUB2 that faces the first substrate SUB1, and a liquid crystal layer LCL disposed between the first substrate SUB1 and the second substrate SUB2. In the embodiment illustrated in FIG. 3, the first substrate SUB1 may be an upper substrate adjacent to the light control member LM, and the second substrate SUB2 may be a lower substrate.

The first substrate SUB1 may include a first base substrate BS1 and a color filter layer CF that is disposed on the first base substrate BS1. The first substrate SUB1 may further include a common electrode CE that is disposed on the color filter layer CF. Referring to FIG. 3, the color filter layer CF may be disposed on a bottom surface of the first base substrate BS1, and the common electrode CE may be disposed on a bottom surface of the color filter layer CF. In other words, the color filter layer CF may be disposed under the first base substrate BS1, and the common electrode CE may be disposed under the color filter layer CF. In addition, the first substrate SUB1 may further include a light shielding layer BM that is disposed at a boundary between the pixel areas PX-1, PX-2, and PX-3 to distinguish the pixel areas PX-1, PX-2, and PX-3 from each other.

The first substrate SUB1 may further include a planarization layer OC that is disposed on the color filter layer CF. Even though not shown in the drawings, the planarization layer OC may be disposed to fill an uneven portion of the color filter layer CF. The planarization layer OC may be disposed between the color filter layer CF and the common electrode CE.

The second substrate SUB2 may face the first substrate SUB1 with the liquid crystal layer LCL interposed therebetween. The second substrate SUB2 may include a second base substrate BS2, and a reflective layer RF and a pixel electrode PE that are disposed on the second base substrate BS2.

The first base substrate BS1 and the second base substrate BS2 may each independently be a polymer substrate, a plastic substrate, a glass substrate, or a quartz substrate. The first base substrate BS1 and the second base substrate BS2 may be transparent insulating substrates. In some embodiments, each of the first base substrate BS1 and the second base substrate BS2 may be rigid. In other embodiments, each of the first base substrate BS1 and the second base substrate BS2 may be flexible.

The second substrate SUB2 may further include an insulating layer PS that is disposed on the second base substrate BS2. The reflective layer RF may be disposed on the insulating layer PS and may overlap with each of the pixel areas PX-1, PX-2, and PX-3. For example, the reflective layers RF may be spaced apart from each other in an area corresponding to the boundary between the pixel areas PX-1, PX-2, and PX-3. The pixel electrode PE may be disposed on the reflective layer RF and may overlap with each of the pixel areas PX-1, PX-2, and PX-3. The pixel electrode PE may cover a side surface of the reflective layer RF. The pixel electrodes PE may be spaced apart from each other at the boundary between the pixel areas PX-1, PX-2, and PX-3. On the other hand, the pixel electrode PE may be omitted unlike the embodiment illustrated in FIG. 3. For example, when the pixel electrode PE is omitted, the reflective layer RF may be a reflective electrode that is used as a pixel electrode.

In the liquid crystal display panel DP according to an embodiment, a first alignment layer AL1 may be disposed on the first substrate SUB1, and a second alignment layer AL2 may be disposed on the second substrate SUB2. In an embodiment, the first alignment layer AL1 may be disposed on a bottom surface of the first substrate SUB1. The first alignment layer AL1 may affect alignment characteristics of first liquid crystal molecules LC1 that are adjacent to the first substrate SUB1, and the second alignment layer AL2 may affect alignment characteristics of second liquid crystal molecules LC2 that are adjacent to the second substrate SUB2. For example, the first alignment layer AL1 and the second alignment layer AL2 may be polyimide-based alignment layers. The first alignment layer AL1 and the second alignment layer AL2 may be formed of the same alignment material. Alternatively, the first alignment layer AL1 and the second alignment layer AL2 may be formed of different alignment materials from each other.

The first alignment layer AL1 and the second alignment layer AL2 may include uneven portions formed by a rubbing method. A rubbing direction in which the uneven portions are formed may determine alignment directions of the liquid crystal molecules that are adjacent to the first alignment layer AL1 and the second alignment layer AL2.

Alternatively, the first alignment layer AL1 and the second alignment layer AL2 may determine the alignment directions of the adjacent liquid crystal molecules by a light alignment method. However, embodiments of the present disclosure are not limited thereto. In certain embodiments, at least one of other various alignment methods other than the rubbing method and the light alignment method may be applied to adjust the alignment directions of the adjacent liquid crystal molecules.

In certain embodiments, the same alignment method or different alignment methods may be applied to the first alignment layer AL1 and the second alignment layer AL2 to determine the alignment directions of the adjacent liquid crystal molecules. For example, the rubbing method may be applied to only one of the first and second alignment layers AL1 and AL2 or may be applied to both of the first alignment layer AU and the second alignment layer AL2. Alternatively, the light alignment method may be applied to at least one or both of the first alignment layer AL1 and the second alignment layer AL2.

A shape of the pixel electrode PE may be changed to determine the alignment directions of the liquid crystal molecules LC1 and LC2 of the liquid crystal layer LCL. For example, the pixel electrode PE may include a stem portion and a branch portion, and the liquid crystal molecules LC1 and LC2 may be aligned in parallel to an extending direction of the branch portion. This will be described later in more detail.

The first alignment layer AU may be disposed on the common electrode CE, and the second alignment layer AL2 may be disposed on the pixel electrode PE. The liquid crystal layer LCL in which the liquid crystal molecules LC1 and LC2 are arranged may be disposed between the first alignment layer AU and the second alignment layer AL2.

The liquid crystal layer LCL is disposed between the first and second substrates SUB1 and SUB2 and includes a plurality of the liquid crystal molecules LC1 and LC2. The liquid crystal molecules LC1 and LC2 having dielectric anisotropy may be arranged to provide the liquid crystal layer LCL. Commonly used liquid crystal molecules may be used in the liquid crystal layer LCL, and the liquid crystal molecules LC1 and LC2 are not limited to specific liquid crystal molecules. For example, the liquid crystal molecules LC1 and LC2 may be formed of an alkenyl-based liquid crystal compound or an alkoxy-based liquid crystal compound.

In some embodiments, the liquid crystal display panel DP of the display device DD may be a twisted nematic (TN) mode display panel, a horizontal alignment mode display panel, a vertical alignment mode display panel, a super vertical alignment (SVA) mode display panel, a super patterned vertical alignment (S-PVA) mode display panel, an optically compensated bend (OCB) mode display panel, or an electrically controlled birefringence (ECB) mode display panel. However, embodiments of the present disclosure are not limited thereto. In certain embodiments, the liquid crystal display panel DP of the display device DD may be a liquid crystal display panel that is operated by a driving method that is different from those of the above-described display panels and has a liquid crystal alignment direction that may be different from those of the above-described display panels.

Figure 4A:
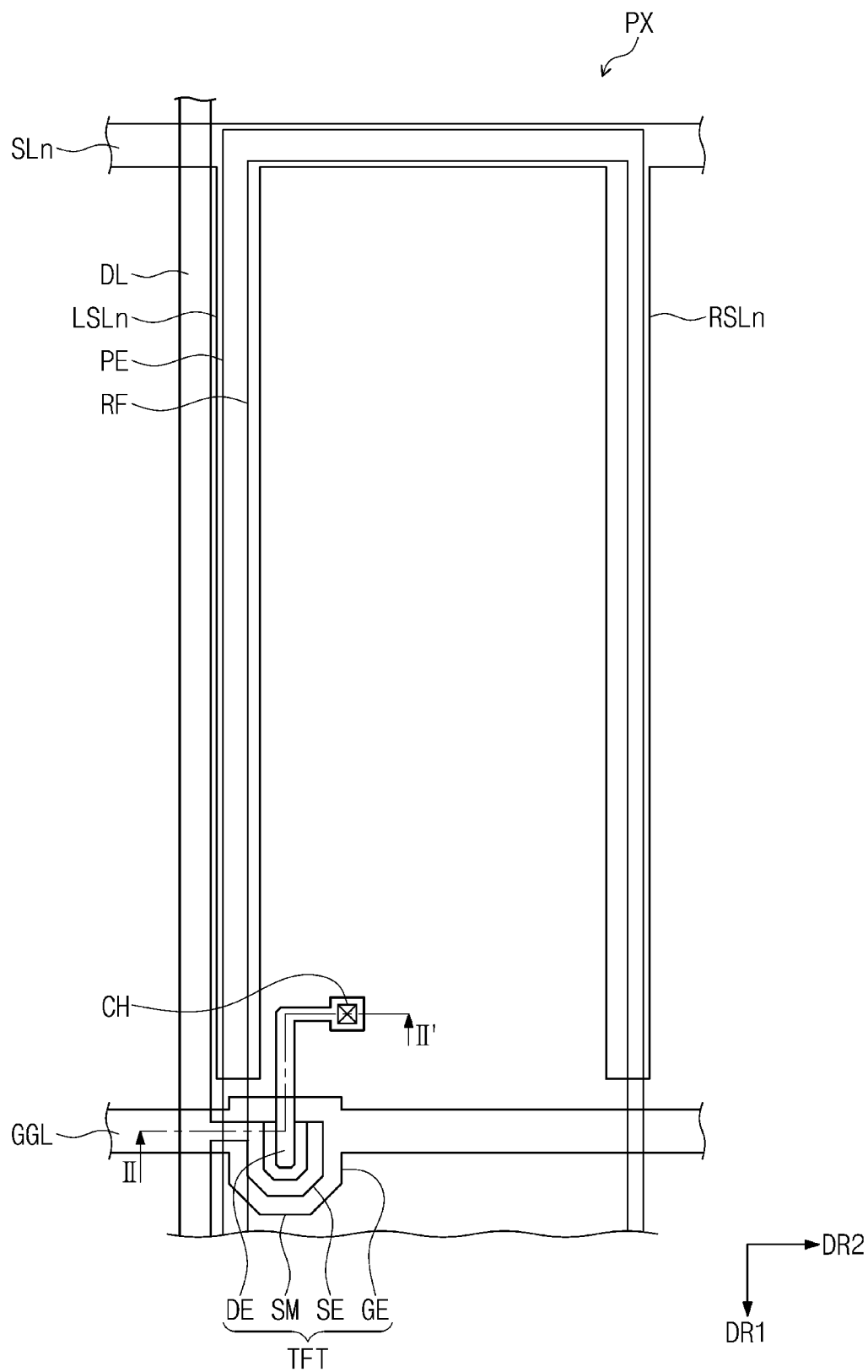
FIG. 4A is a plan view illustrating a pixel included in a display device according to an embodiment of the present disclosure.
Figure 4B:
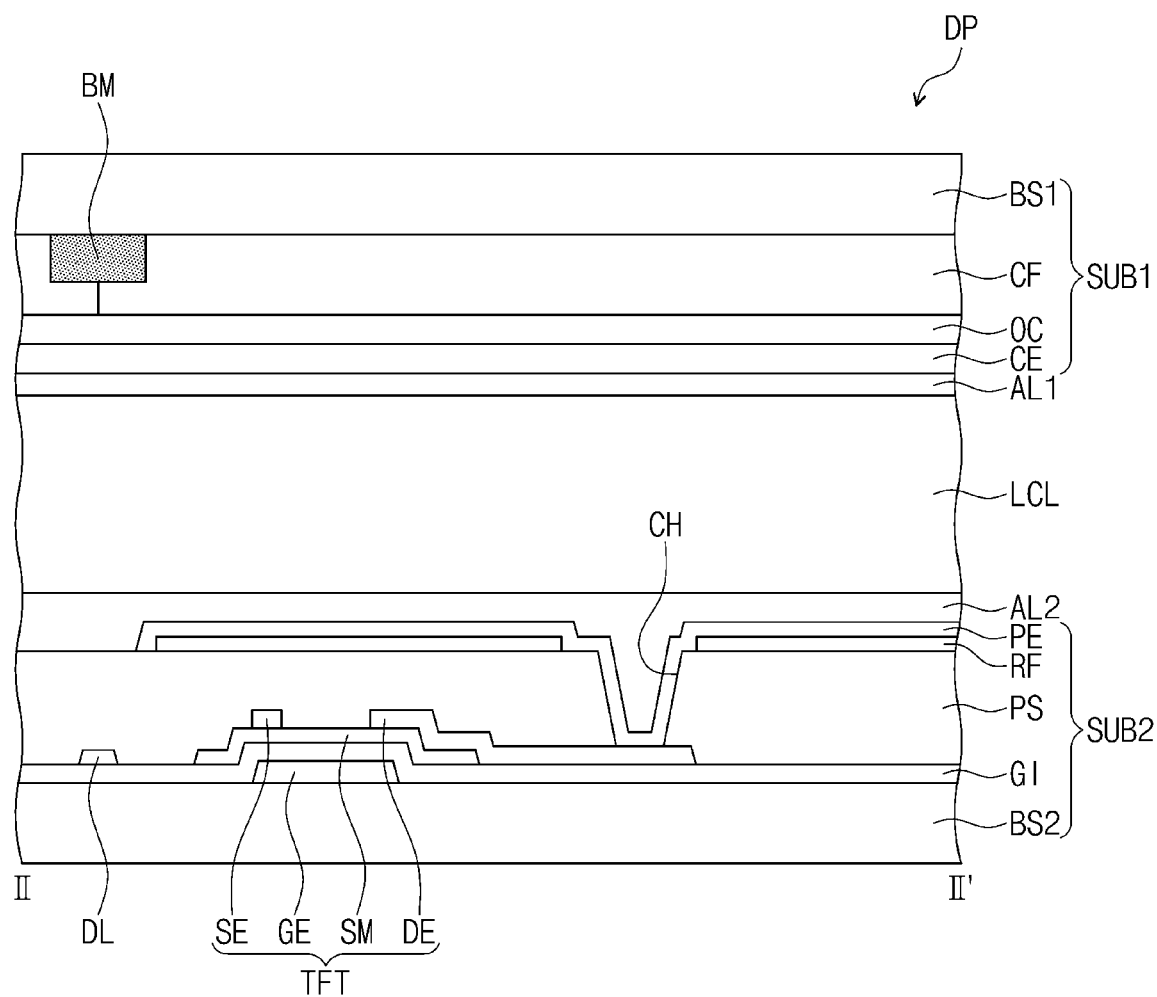
FIG. 4B is a cross-sectional view illustrating a display panel included in a display device according to an embodiment of the present disclosure.
Figure 4C:
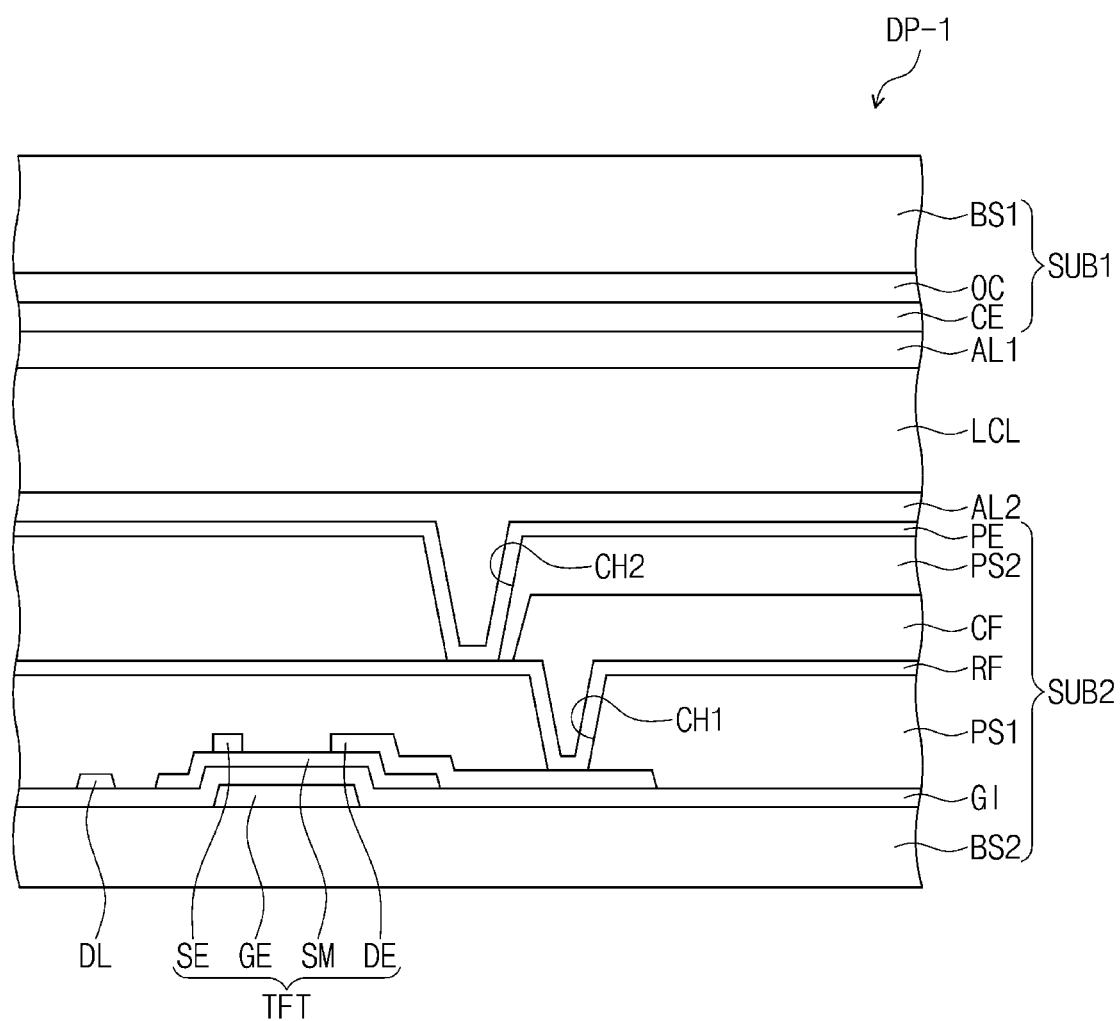
FIG. 4C is a cross-sectional view illustrating a display panel included in a display device according to another embodiment of the present disclosure.

FIG. 4A is a schematic plan view illustrating one of pixels included in a display device according to an embodiment of the present disclosure. FIG. 4B is a cross-sectional view corresponding to a line II-II' of FIG. 4A. FIG. 4C is a cross-sectional view corresponding to an area of FIG. 4B to illustrate a display device according to another embodiment of the present disclosure.

One pixel is illustrated as an example in FIG. 4A, and a structure of each of other pixels may be substantially the same or similar as the structure of the pixel illustrated in FIG. 4A. The pixel PX connected to one of gate lines GGL and one of data lines DL is illustrated in FIG. 4A for the purpose of ease and convenience in description and illustration. However, embodiments of the present disclosure are not limited thereto. In certain embodiments, a plurality of pixels may be connected to one gate line and one data line, or one pixel may be connected to a plurality of gate lines and a plurality of data lines.

Referring to FIGS. 4A and 4B, the gate line GGL extends in the direction of the second directional axis DR2. The gate line GGL may be formed on the second base substrate BS2. The data line DL may extend in the direction of the first directional axis DR1 intersecting the gate line GGL.

The pixel PX includes a thin film transistor TFT, the pixel electrode PE connected to the thin film transistor TFT, and a storage electrode part. The thin film transistor TFT includes a gate electrode GE, a gate insulating layer GI, a semiconductor pattern SM, a source electrode SE, and a drain electrode DE. The storage electrode part may include a storage line SLn extending in the direction of the second directional axis DR2 and may further include a first branch electrode LSLn and a second branch electrode RSLn that are branched from the storage line SLn to extend in the direction of the first directional axis DR1.

The gate electrode GE may protrude from the gate line GGL or may be provided on a predetermined area of the gate line GGL. The gate electrode GE may include a metal. For example, the gate electrode GE may be formed of at least one of nickel, chromium, molybdenum, aluminum, titanium, copper, tungsten, or any alloy thereof. The gate electrode GE may be formed of a single layer or multi-layer using one or more metals. For example, the gate electrode GE may be formed of a triple layer including molybdenum, aluminum, and molybdenum that are sequentially stacked. Alternatively, the gate electrode GE may be formed of a double layer including titanium and copper that are sequentially stacked. In still another embodiment, the gate electrode GE may be a single layer formed of an alloy of titanium and copper.

The semiconductor pattern SM is provided on the gate insulating layer GI. The semiconductor pattern SM is provided on the gate electrode GE with the gate insulating layer GI interposed therebetween. A portion of the semiconductor pattern SM overlaps with the gate electrode GE. The semiconductor pattern SM includes an active pattern (not shown) provided on the gate insulating layer GI and an ohmic contact layer (not shown) formed on the active pattern. The active pattern (not shown) may be formed of an amorphous silicon thin layer, and the ohmic contact layer (not shown) may be formed of an n+ amorphous silicon thin layer. The ohmic contact layer (not shown) forms an ohmic contact between the active pattern and the source electrode SE and between the active pattern and the drain electrode DE.

The source electrode SE is branched from the data line DL. The source electrode SE is formed on the ohmic contact layer (not shown), and a portion of the source electrode SE overlaps with the gate electrode GE. The data line DL may be disposed on an area of the gate insulating layer GI on which the semiconductor pattern SM is not disposed.

The drain electrode DE is spaced apart from the source electrode SE with a portion of the semiconductor pattern SM interposed therebetween when viewed in a plan view. The drain electrode DE is formed on the ohmic contact layer (not shown), and a portion of the drain electrode DE overlaps with the gate electrode GE.

For example, the source electrode SE and the drain electrode DE may be formed of at least one of nickel, chromium, molybdenum, aluminum, titanium, copper, tungsten, or any alloy thereof. The source electrode SE and the drain electrode DE may be formed of a single layer or multi-layer using one or more metals. For example, the source electrode SE and the drain electrode DE may be formed of a double layer including titanium and copper that are sequentially stacked. Alternatively, the source electrode SE and the drain electrode DE may be a single layer formed of an alloy of titanium and copper.

A top surface of the active pattern of the semiconductor pattern SM between the source electrode SE and the drain electrode DE is exposed in the plan view, and the active pattern between the source and drain electrodes SE and DE in the plan view is defined as a channel portion in which a conductive channel is formed between the source electrode SE and the drain electrode DE when a voltage is applied to the gate electrode GE. The source electrode SE and the drain electrode DE overlap with portions of a remaining area of the semiconductor pattern SM except the channel portion defined between the source and drain electrodes SE and DE in the plan view.

The pixel electrode PE is connected to the drain electrode DE with the insulating layer PS interposed therebetween. The pixel electrode PE partially overlaps with the storage line SLn, the first branch electrode LSLn, and the second branch electrode RSLn to form a storage capacitor.

The insulating layer PS covers the source electrode SE, the drain electrode DE, the channel portion, and the gate insulating layer GI and has a contact hole CH exposing a portion of the drain electrode DE. The insulating layer PS may include, for example, silicon nitride or silicon oxide.

The reflective layer RF may be disposed on the insulating layer PS. The reflective layer RF may be disposed between the insulating layer PS and the pixel electrode PE. For example, the reflective layer RF may be formed of a metal having a high reflectance, such as aluminum, an aluminum alloy, or silver (Ag). In the present embodiment, the reflective layer RF overlaps with the pixel electrode PE. However, embodiments of the present disclosure are not limited thereto. As illustrated in FIG. 4B, the reflective layer RF may not be disposed in the contact hole CH.

The pixel electrode PE is connected to the drain electrode DE through the contact hole CH that is formed in the insulating layer PS. The pixel electrode PE may be formed of a transparent conductive material. For example, the pixel electrode PE may be formed of a transparent conductive oxide. The transparent conductive oxide may be indium tin oxide (ITO), indium zinc oxide (IZO), or indium tin zinc oxide (ITZO).

FIG. 4C is a cross-sectional view illustrating a liquid crystal display panel included in a display device according to another embodiment. A liquid crystal display panel DP-1 shown the embodiment of FIG. 4C corresponds to the cross-sectional view of the liquid crystal display panel DP shown in the embodiment of FIG. 4B. In descriptions of the embodiment of FIG. 4C, the same descriptions as in the embodiment of FIGS. 1 to 4B will be omitted for the purpose of ease and convenience in description, and differences between the present embodiment and the embodiment of FIGS. 1 to 4B will be mainly described hereinafter.

Unlike the liquid crystal display panel DP of the embodiment illustrated in FIG. 4B, a color filter layer CF may be included in a second substrate SUB2 in the liquid crystal display panel DP-1 of the embodiment illustrated in FIG. 4C. The color filter layer CF may be disposed on a reflective layer RF. In other words, the second substrate SUB2 may include a second base substrate BS2, a thin film transistor TFT that is formed on the second base substrate BS2, a first insulating layer PS1, the reflective layer RF that is disposed on the first insulating layer PS1 and connected to the thin film transistor TFT through a first contact hole CH1, and the color filter layer CF and a pixel electrode PE that are formed on the reflective layer RF. A second insulating layer PS2 may further be disposed between the color filter layer CF and the pixel electrode PE. The pixel electrode PE may be electrically connected to the thin film transistor TFT through a second contact hole CH2 defined in the second insulating layer PS2. For example, the pixel electrode PE may be in contact with the reflective layer RF that is exposed through the second contact hole CH2.

A first substrate SUB1 may include a first base substrate BS1 and a common electrode CE. Referring to FIG. 4C, the liquid crystal display panel DP-1 according to the present embodiment may include the first base substrate BS1 and the common electrode CE that are disposed under the first base substrate BS1. In an embodiment, the liquid crystal display panel DP-1 may further include a planarization layer OC that is disposed between the common electrode CE and the first base substrate BS1.

In other words, in the liquid crystal display panel DP of FIG. 4B, the first substrate SUB1 is a color filter substrate, and the second substrate SUB2 is an array substrate. That is, the liquid crystal display panel DP of FIG. 4B is a display panel in which the color filter layer CF is formed in the upper substrate. On the contrary, the second substrate SUB2 may function as both the color filter substrate and the array substrate in the liquid crystal display panel DP-1 of the embodiment illustrated in FIG. 4C. In addition, the liquid crystal display panels DP and DP-1 according to the embodiments of FIGS. 4B and 4C may be reflective liquid crystal display panels including the reflective layer RF.

Referring to FIGS. 4B and 4C, a first alignment layer AL1 may be disposed under the first substrate SUB1, and a second alignment layer AL2 may be disposed on the second substrate SUB2. A liquid crystal layer LCL may be disposed between the first alignment layer AL1 and the second alignment layer AL2.

The liquid crystal display panel included in the display device DD may not be limited to the embodiments illustrated in FIGS. 4B and 4C. In certain embodiments, reflective or transflective liquid crystal display panels having other various stack structures may be applied to the display device DD. For example, a pattern shape of the reflective layer is not limited to the embodiments shown in FIGS. 4B and 4C but can be changed according to a position of a circuit layer including the thin film transistor, a shape of the pixel, and/or a pattern shape of the color filter layer. In certain embodiments, the display device according to an embodiment may further include a light source part, and the liquid crystal display panel of the display device may be a transflective liquid crystal display panel that displays an image using external light or light provided from the light source part of the display device.

Figure 5A:
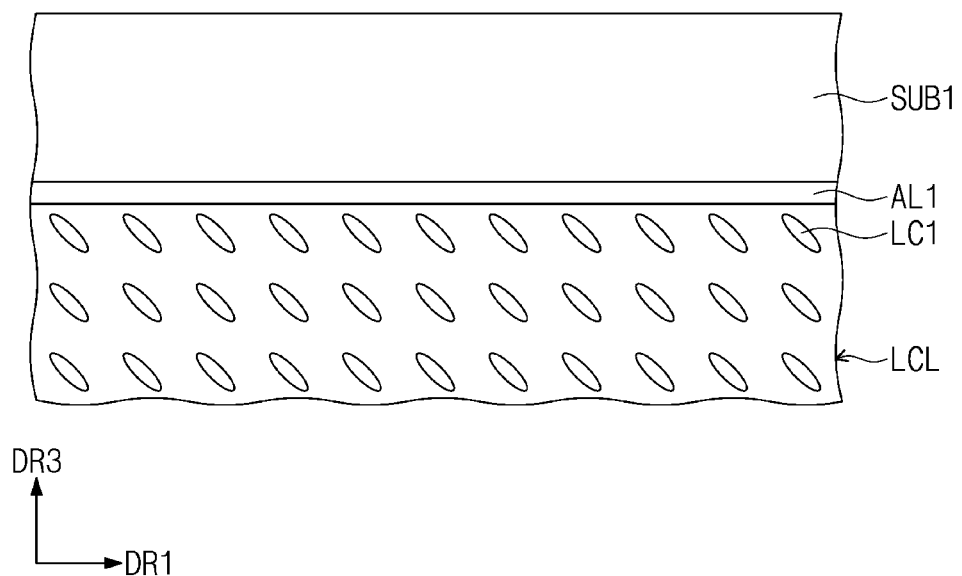
FIG. 5A is a schematic view illustrating an alignment state of a liquid crystal molecule in an embodiment of the present disclosure.
Figure 5B:
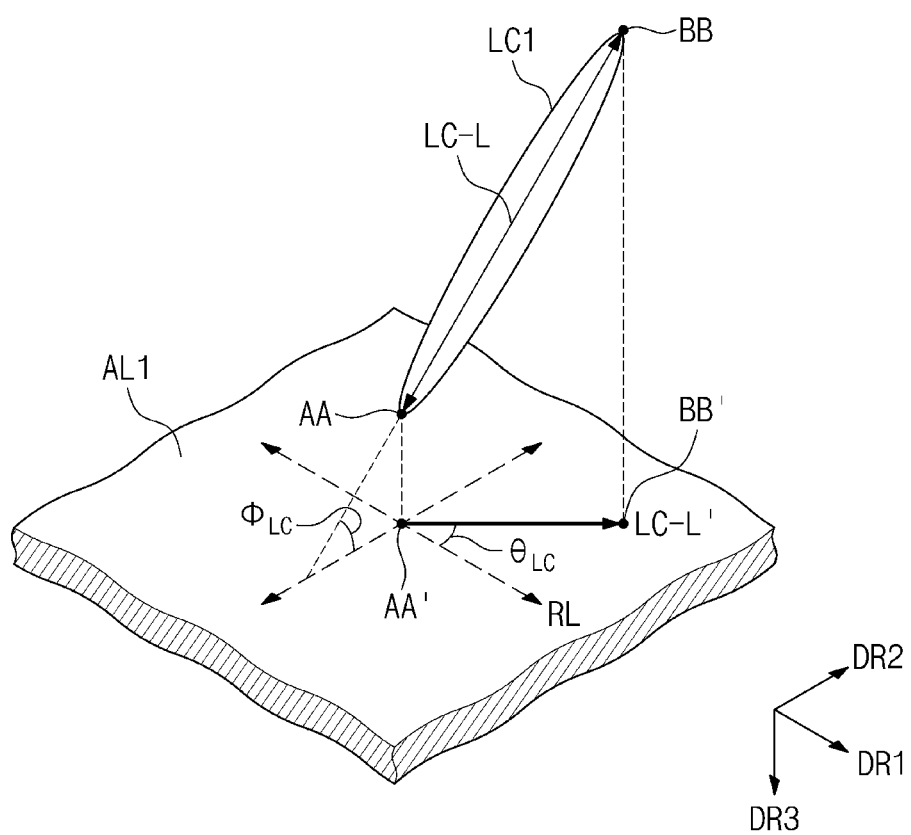
FIG. 5B is a schematic view illustrating an alignment angle of a liquid crystal molecule in an embodiment of the present disclosure.

FIG. 5A is a cross-sectional view schematically illustrating an alignment state of the first liquid crystal molecule LC1 that is adjacent to the first substrate SUB1 in the display device according to an embodiment. FIG. 5B is a schematic view illustrating an alignment direction of the first liquid crystal molecule LC1.

Alignment characteristics of the first liquid crystal molecule LC1 that is adjacent to the first substrate SUB1 may be determined by the first alignment layer AL1. For example, the first liquid crystal molecule LC1 may be horizontally aligned such that an alignment direction of a long axis LC-L of the first liquid crystal molecule LC1 is parallel to a flat surface (or a plane) of the first alignment layer AL1, or the first liquid crystal molecule LC1 may be vertically aligned such that the alignment direction of the long axis LC-L is vertical to the flat surface of the first alignment layer AL1.

The first liquid crystal molecule LC1 that is adjacent to the first alignment layer AL1 may be disposed in parallel to the flat surface of the first alignment layer AL1 or may be disposed at a predetermined line inclination angle with respect to the flat surface of the first alignment layer AL1. The line inclination angle may be an angle between the long axis LC-L of the first liquid crystal molecule LC1 and one surface of the first alignment layer AL1 that is adjacent to the first liquid crystal molecule LC1. In other words, as illustrated in FIG. 5B, an angle DLC at which the first liquid crystal molecule LC1 is inclined with respect to the flat surface of the first alignment layer AL1 may correspond to the line inclination angle of the first liquid crystal molecule LC1.

For example, when the first liquid crystal molecule LC1 is vertically aligned, the line inclination angle $\Phi_{LC}$ of the first liquid crystal molecule LC1 may be about 90 degrees. When the long axis LC-L of the first liquid crystal molecule LC1 is parallel to the flat surface of the first alignment layer AL1, the line inclination angle $\Phi_{LC}$ of the first liquid crystal molecule LC1 may be about 0 degree.

An alignment direction of the first liquid crystal molecule LC1 that is projected on a flat surface of the first substrate SUB1 is herein referred to as 'a first alignment direction.' The first alignment direction may represent an alignment direction of a long axis LC-L' of the first liquid crystal molecule LC1 that is projected on the first substrate SUB1. In addition, the first alignment direction may represent an alignment direction of the long axis LC-L' of the first liquid crystal molecule LC1 that is projected on the first alignment layer AL1.

Referring to FIG. 5B, the alignment direction of the first liquid crystal molecule LC1 may be a direction that links from one end AA to another end BB of the first liquid crystal molecule LC1 in a direction of the long axis LC-L of the first liquid crystal molecule LC1. In addition, the first alignment direction of the first liquid crystal molecule LC1 in a plan view may be the alignment direction of the long axis LC-L' of the first liquid crystal molecule LC1 that is projected on the flat surface of the first alignment layer AL1. The first alignment direction may be a direction that links from one end AA' to another end BB' of the first liquid crystal molecule that are projected on the first alignment layer AL1. The long axis LC-L' of the first liquid crystal molecule LC1 that is projected on the flat surface may have an azimuth $\theta_{LC}$. For example, the azimuth $\theta_{LC}$ of the long axis LC-L' of the first liquid crystal molecule LC1 that is projected on the flat surface may represent an increasing angle with respect to a reference line RL on the flat surface in a counterclockwise direction.

For example, the reference line RL may be parallel to the first directional axis DR1. In this case, when the azimuth $\theta_{LC}$ is 0 degree, the long axis LC-L' of the first liquid crystal molecule LC1 that is projected on the flat surface may be aligned in parallel to the first directional axis DR1. When the azimuth $\theta_{LC}$ is 90 degrees, the long axis LC-L' of the first liquid crystal molecule LC1 that is projected on the flat surface may be aligned in parallel to the second directional axis DR2. In an embodiment, the first alignment direction of the first liquid crystal molecule LC1 may be parallel to the first directional axis DR1. In other words, in the display device DD according to an embodiment, the first liquid crystal molecule LC1 that is adjacent to the first substrate may have the long axis LC-L' that is projected on the first substrate to be aligned in the first directional axis DR1.

In the present specification, an element or component that is "parallel" to another element or component may mean that an element or component is substantially parallel to another element or component and may further mean that an optical axis or alignment direction of an element or component is substantially parallel to that of another element or component in substantially the same direction.

The first liquid crystal molecule LC1 that is aligned by the first alignment layer AL1 is illustrated in FIGS. 5A and 5B. However, the descriptions of FIGS. 5A and 5B may also be applied to the second liquid crystal molecule LC2 adjacent to the second alignment layer AL2 (see FIG. 3). For example, referring to FIGS. 3, 5A, and 5B, the alignment direction of the second liquid crystal molecule LC2 that is adjacent to the second alignment layer AL2 may be determined by the second alignment layer AL2.

An alignment direction of the second liquid crystal molecule LC2 that is adjacent to the second substrate SUB2 in a plan view may represent an alignment direction of a long axis of the second liquid crystal molecule LC2 that is projected on the second substrate SUB2. The alignment direction of the long axis of the second liquid crystal molecule LC2 that is projected on the second substrate SUB2 is herein referred to as 'a second alignment direction.' The second alignment direction may represent an alignment direction of a long axis of the second liquid crystal molecule LC2 that is projected on the second alignment layer AL2.

The second alignment direction corresponding to the alignment direction of the long axis of the second liquid crystal molecule LC2 that is projected on a plane may be the same as the first alignment direction corresponding to the alignment direction of the long axis of the first liquid crystal molecule LC1 that is projected on a plane. Alternatively, the first alignment direction and the second alignment direction may be opposite to each other. In still another embodiment, the first alignment direction and the second alignment direction may intersect each other with a predetermined angle therebetween. For example, the angle between the first alignment direction and the second alignment direction may range from 60 degrees to 90 degrees.

An alignment direction of a liquid crystal molecule may be changed depending on physical and/or chemical properties of a surface of an alignment layer that is adjacent to the liquid crystal molecule. For example, when the surface of the alignment layer is processed by the rubbing method, the alignment direction of the liquid crystal molecule that is adjacent to the alignment layer may correspond to a rubbing direction of the alignment layer.

Figure 5C:
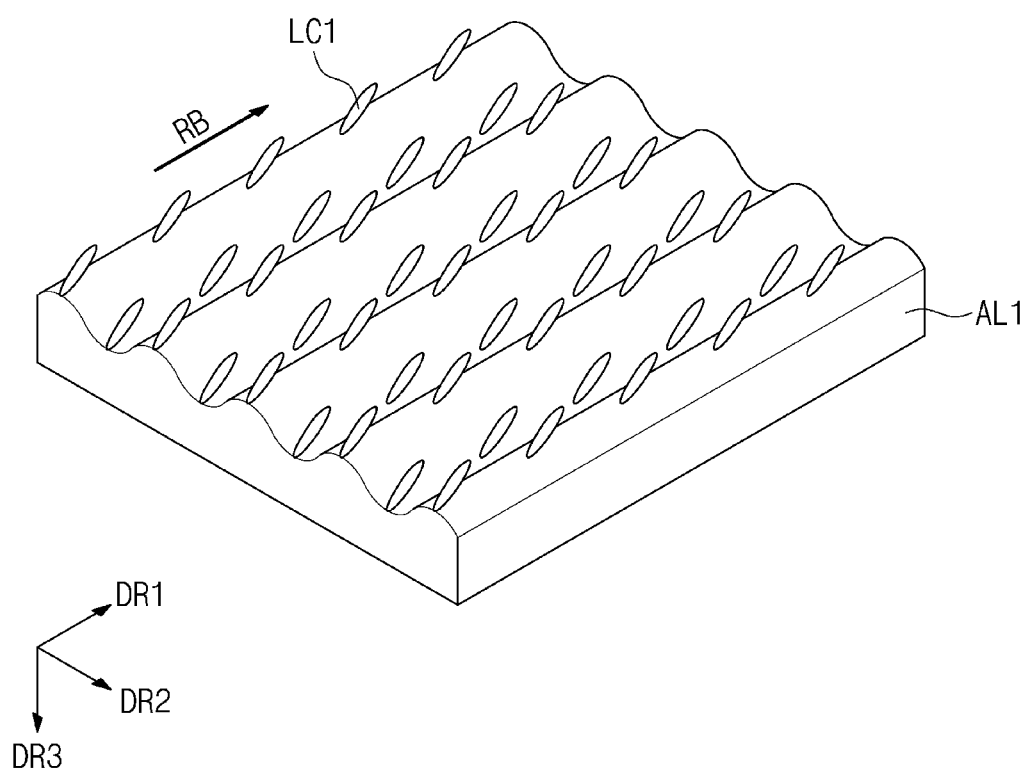
FIG. 5C is a schematic view illustrating an alignment state of a liquid crystal molecule in an embodiment of the present disclosure.

FIG. 5C is a schematic view illustrating the first alignment layer AL1 and an alignment state of the first liquid crystal molecule LC1 that is aligned on the first alignment layer AL1. In the display device according to an embodiment, when the first alignment layer AL1 is rubbed to have a first rubbing direction RB, the first alignment direction of the first liquid crystal molecule LC1 may be parallel to the first rubbing direction RB. In other words, the first alignment direction of the first liquid crystal molecule LC1 and the first rubbing direction RB of the first alignment layer AL1 may be parallel to the first directional axis DR1. The first alignment direction corresponds to the alignment direction of the long axis of the first liquid crystal molecule LC1 that is projected on the first alignment layer AL1.

Figure 6A:
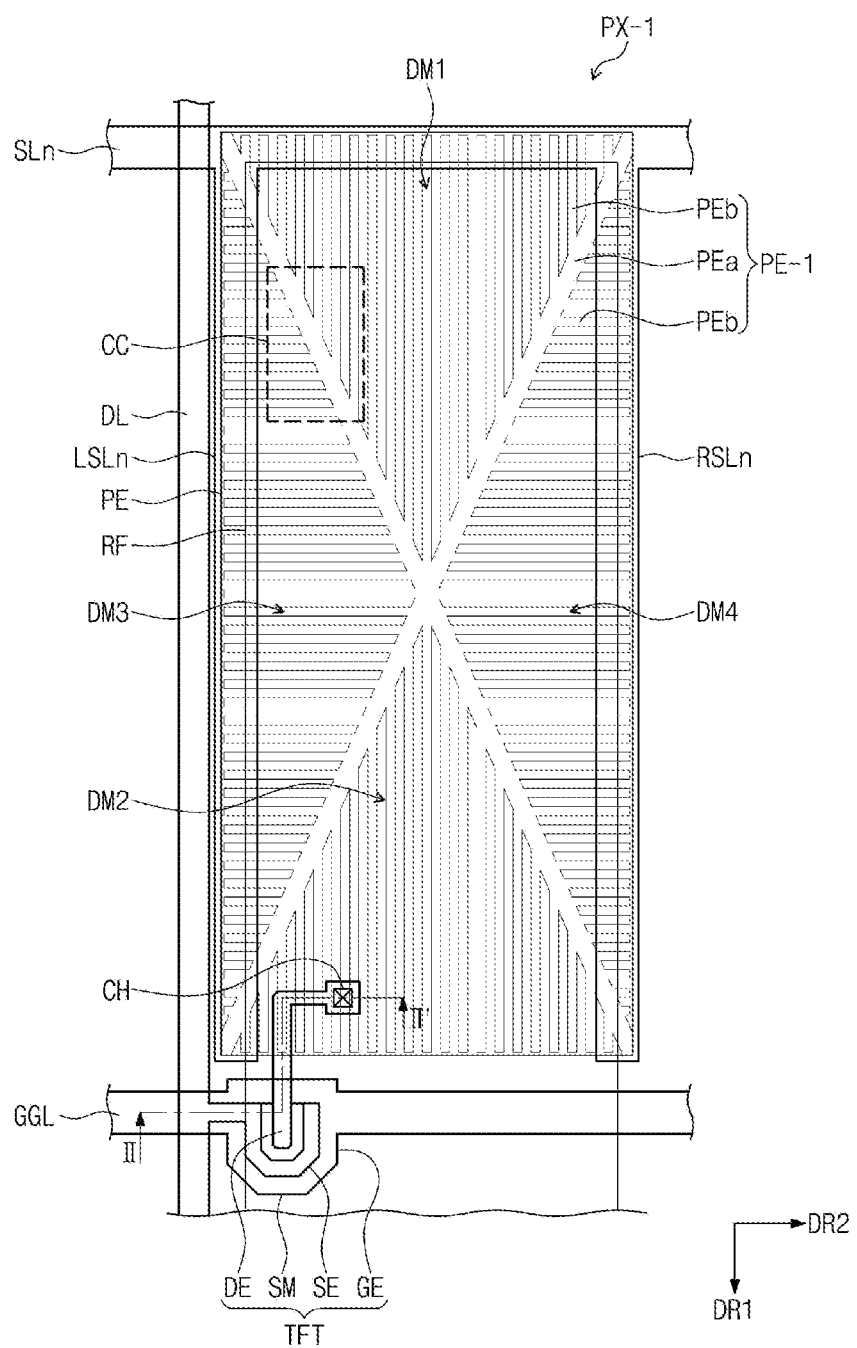
FIG. 6A is a plan view illustrating a pixel included in a display device according to an embodiment of the present disclosure.
Figure 6B:
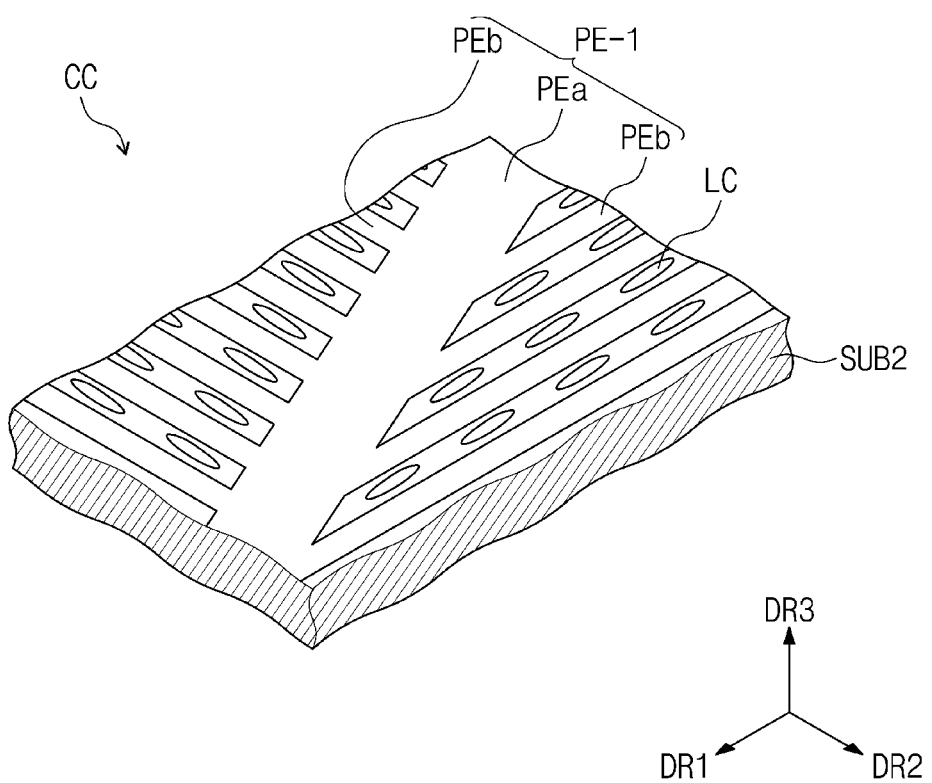
FIG. 6B is a schematic view illustrating an alignment state of a liquid crystal molecule in an embodiment of the present disclosure.

FIG. 6A is a schematic plan view illustrating one of pixels included in a display device according to an embodiment of the present disclosure. FIG. 6B is a schematic view illustrating an alignment state of liquid crystal molecules LC in an area CC of FIG. 6A. For example, FIG. 6B may illustrate an alignment state of the liquid crystal molecules LC when an electric field is applied to a pixel electrode PE-1 of a pixel PX-1. In descriptions of FIGS. 6A and 6B, the same descriptions as in the embodiment of FIG. 4A will be omitted for the purpose of ease and convenience in description, and differences between the present embodiment and the embodiment of FIG. 4A will be mainly described hereinafter.

Unlike the pixel PX of FIG. 4A, the pixel electrode PE-1 of the pixel PX-1 of FIG. 6A may include a stem portion PEa and a branch portion PEb extending from the stem portion PEa. In addition, the pixel PX-1 illustrated in FIG. 6A may include a plurality of domains DM1, DM2, DM3, and DM4.

Referring to FIG. 6A, the pixel electrode PE-1 includes the stem portion PEa and a plurality of the branch portions PEb protruding and extending from the stem portion PEa. The stem portion PEa or a portion of the branch portions PEb may be connected to the drain electrode DE through the contact hole CH.

The stem portion PEa may have various shapes. For example, the stem portion PEa may have an X-shape when viewed in a plan view, as illustrated in FIG. 6A. The branch portions PEb do not meet each other but are spaced apart from each other. The branch portions PEb extend in parallel to each other in each of the domains DM1, DM2, DM3, and DM4 that are divided by the stem portion PEa. A spacing between the branch portions PEb that are adjacent to each other may be in the order of micrometer(s), and the spacing and pattern of the branch portions PEb may be used to align liquid crystal molecules of a liquid crystal layer LCL in a specific direction.

The pixel PX-1 may be divided into the plurality of domains DM1, DM2, DM3, and DM4 by the stem portion PEa. The branch portions PEb may correspond to each of the domains DM1, DM2, DM3, and DM4, and an extending direction of the branch portions PEb in one or some of the domains DM1, DM2, DM3, and DM4 may be different from an extending direction of the branch portions PEb in another or others of the domains DM1, DM2, DM3, and DM4. In the embodiment of the present disclosure, the pixel PX-1 includes four domains. However, embodiments of the present disclosure are not limited thereto. In certain embodiments, the pixel PX-1 may have various numbers of domains, for example, two, six, or eight, etc. In addition, a division form of the domains is not limited to the embodiment of FIG. 6A. In certain embodiments, the stem portion PEa may be aligned in parallel to the first directional axis DR1 or the second directional axis DR2 to separate the domains from each other.

In FIG. 6B, the liquid crystal molecule LC may represent the first liquid crystal molecule LC1 (see FIG. 3) or the second liquid crystal molecule LC2 (see FIG. 3). In other words, in an embodiment, the first alignment direction of the first liquid crystal molecule LC1 (see FIG. 3) may be the same as the second alignment direction of the second liquid crystal molecule LC2.

Referring to FIGS. 6A and 6B, the extending direction of the branch portions PEb may be parallel to the alignment direction of the liquid crystal molecule LC. In other words, the liquid crystal molecules LC may be disposed and/or aligned in parallel to the extending direction of the branch portions PEb in the display device that includes the pixel electrode PE-1 having the branch portions PEb. Referring to FIGS. 6A and 6B, in an embodiment, the liquid crystal molecules LC may be aligned in parallel to the first directional axis DR1 that is parallel to the extending direction of the branch portions PEb in the first and third domains DM1 and DM3, and the liquid crystal molecules LC may be aligned in parallel to the second directional axis DR2 that is parallel to the extending direction of the branch portions PEb in the second and fourth domains DM2 and DM4.

Referring back to FIG. 3, the light control member LM may be disposed on the liquid crystal display panel DP in the display device DD according to an embodiment. The light control member LM may be disposed between the liquid crystal display panel DP and the polarizing member PM.

The light control member LM may be an optical member that transmits light incident from the outside to the liquid crystal display panel DP and collects light that is transmitted from the liquid crystal display panel DP to the outside, in the front direction. The light control member LM may be an optical film that controls a traveling direction of light to transfer light that is generated in the liquid crystal display panel DP and provided as an image into a viewing range of a user. The light control member LM may act as the optical member that collects or concentrates light that is reflected by the reflective layer RF of the liquid crystal display panel DP and is then transmitted through the liquid crystal layer LCL in the front direction to improve the display quality of the display device DD.

Figure 7A:
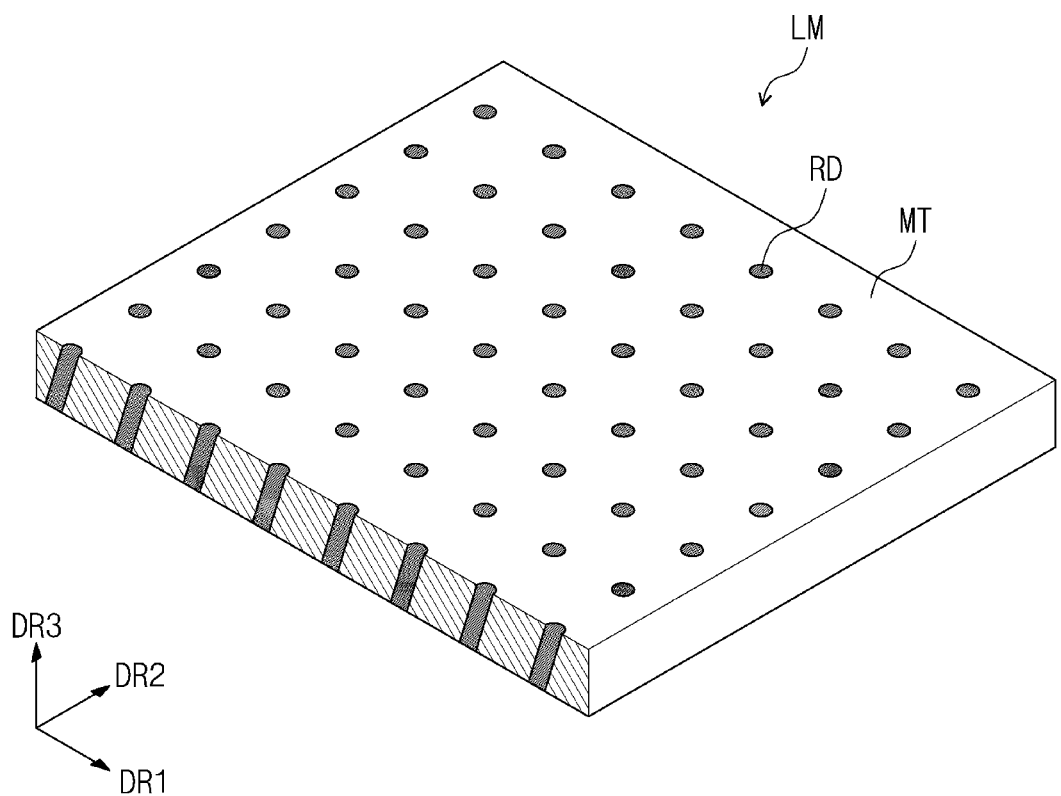
FIG. 7A is a perspective view illustrating a light control member included in a display device according to an embodiment of the present disclosure.
Figure 7B:
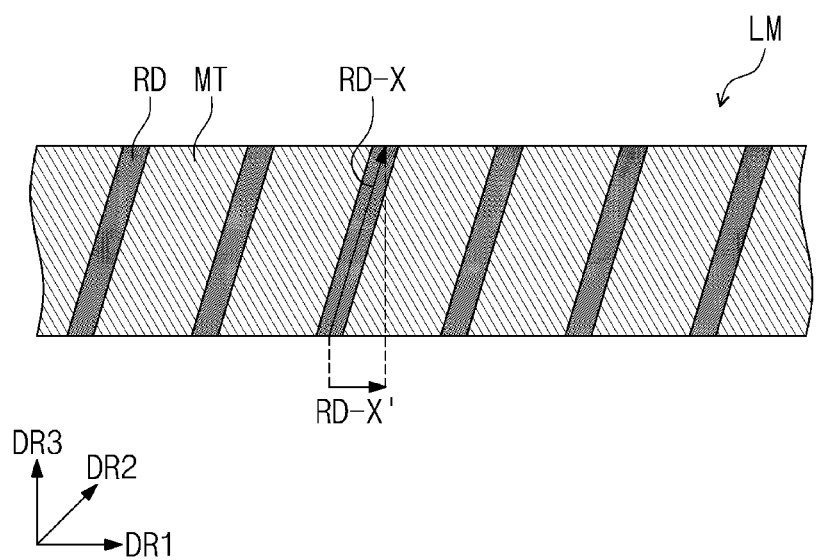
FIG. 7B is a cross-sectional view illustrating a light control member included in a display device according to an embodiment of the present disclosure.

FIGS. 7A and 7B are views illustrating the light control member LM included in the display device according to an embodiment of the present disclosure. FIG. 7A is a perspective view illustrating a portion of the light control member LM according to an embodiment of the present disclosure, and FIG. 7B is a cross-sectional view illustrating the light control member LM according to an embodiment of the present disclosure.

The light control member LM may be formed to include two portions having different refractive indexes from each other. The light control member LM may include a first optical part RD having a relatively high refractive index and a second optical part MT having a refractive index lower than that of the first optical part RD. The second optical part MT may be distinguished from the first optical part RD. Referring to FIGS. 7A and 7B, in an embodiment, the first optical part RD may have a rod shape, and the second optical part MT may correspond to a base part that fills a space between a plurality of the first optical parts RD.

The first optical part RD having the rod shape may be formed of a material of which the refractive index is higher than that of the second optical part MT corresponding to the base part that arranges the first optical parts RD. For example, the light control member LM may be formed of an acrylate-based material. The light control member LM may be formed to include two or more acrylate-based compounds that are different from each other.

In an embodiment, two kinds of acrylate-based compounds may be mixed with each other, the mixture may be phase-separated using laser light to separate the first optical part RD and the second optical part MT from each other, and then, the light control member LM may be formed by fixing the first optical part RD and the second optical part MT that are phase-separated from each other.

For example, the first optical part RD may be a polymer of an acrylate-based compound represented by the following chemical formula 1.

[Chemical formula 1]

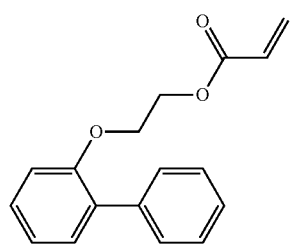

In addition, the second optical part MT may be a polymer of an acrylate oligomer represented by the following chemical formula 2. In the following chemical formula 2, 'n' may be an integral number equal to or greater than 1 and equal to or less than 10. For example, the compound represented by the following chemical formula 2 may be a urethane methacrylate oligomer.

[Chemical formula 2]

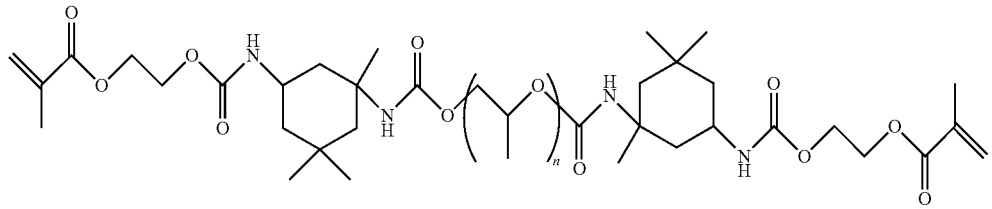

For example, the refractive index of the first optical part RD that includes the acrylate-based compound represented by the chemical formula 1 may be higher than the refractive index of the second optical part MT that includes the acrylate-based compound represented by the chemical formula 2.

Referring to FIGS. 7A and 7B, an alignment direction RD-X of the first optical part RD may be inclined with respect to a top surface or a bottom surface of the light control member LM. The alignment direction of the first optical part RD may correspond to an extending direction of a long axis of the first optical part RD. In the display device according to an embodiment, the light control member LM may include the first optical part RD aligned in the direction of the first directional axis DR1 that is parallel to the first alignment direction of the first liquid crystal molecule LC1 (see FIG. 5C) of the liquid crystal display panel. In addition, in the display device according to an embodiment, the light control member LM may include the first optical part RD that is parallel to the branch portion PEb (see FIG. 6A) of the pixel electrode of the liquid crystal display panel. Alternatively, in the display device according to an embodiment, the light control member LM may include the first optical part RD that is perpendicular to the branch portion PEb (see FIG. 6A) of the pixel electrode of the liquid crystal display panel.

When the first optical part RD is projected on the first substrate SUB1 (see FIG. 3) of the display device, an extending direction RD-X' of a long axis of the first optical part RD may be parallel to the first directional axis DR1. An alignment direction of the long axis of the projected first optical part RD may be defined as the extending direction RD-X' of the long axis of the first optical part RD that is projected on an imaginary plane defined by the first directional axis DR1 and the second directional axis DR2. The extending direction RD-X' of the long axis of the first optical part RD that is projected on an imaginary plane parallel to one surface of the first substrate SUB1 is herein referred to as 'a third alignment direction.' The first alignment direction of the first liquid crystal molecule of the liquid crystal display panel may be parallel to the third alignment direction of the first optical part RD. For example, the first alignment direction of the first liquid crystal molecule may be the same as the third alignment direction of the first optical part RD.

In addition, in the display devices of the embodiments described with reference to FIGS. 3 to 4C, an azimuth direction of the long axis of the first liquid crystal molecule LC1 that is adjacent to the first substrate SUB1 (or the upper substrate) may be parallel to an azimuth direction of the long axis of the first optical part RD that is included in the light control member LM. Herein, the azimuth direction of the long axis of the first liquid crystal molecule LC1 refers to the long axis LC-L' that is projected on a plane defined by the first directional axis DR1 and the second directional axis DR2 as shown in FIG. 5B, for example, the first alignment direction and the second alignment direction. The azimuth direction of the long axis of the first optical part RD refers to the projected extending direction RD-X' as shown in FIG. 7B, for example, the third alignment direction. In the display device of an embodiment, the azimuth direction of the long axis of the first liquid crystal molecule LC1 that is adjacent to the first substrate SUB1 (or the upper substrate) may be substantially the same as the azimuth direction of the long axis of the first optical part RD that is included in the light control member LM. In other words, in an embodiment, the azimuth of the long axis of the first liquid crystal molecule LC1 may be substantially equal to an azimuth of the long axis of the first optical part RD on the basis of a reference line, for example, the first directional axis DR1 or the second directional axis DR2. Alternatively, in an embodiment, an angle between the azimuth direction of the long axis of the first liquid crystal molecule LC1 and the azimuth direction of the long axis of the first optical part RD on the basis of the reference line may be 180 degrees.

In the display device of an embodiment, the light control member LM may be disposed on the liquid crystal display panel and may include the first optical part RD having the alignment direction parallel to a first direction, and thus light can be collected or concentrated in the front direction corresponding to a display direction of an image. As a result, the display quality of the display device can be improved. Here, the alignment direction of the first optical part RD may correspond to the extending direction of the long axis of the first optical part RD that is projected on an imaginary plane and parallel to one surface of the first substrate of the liquid crystal display panel.

Figure 8A:
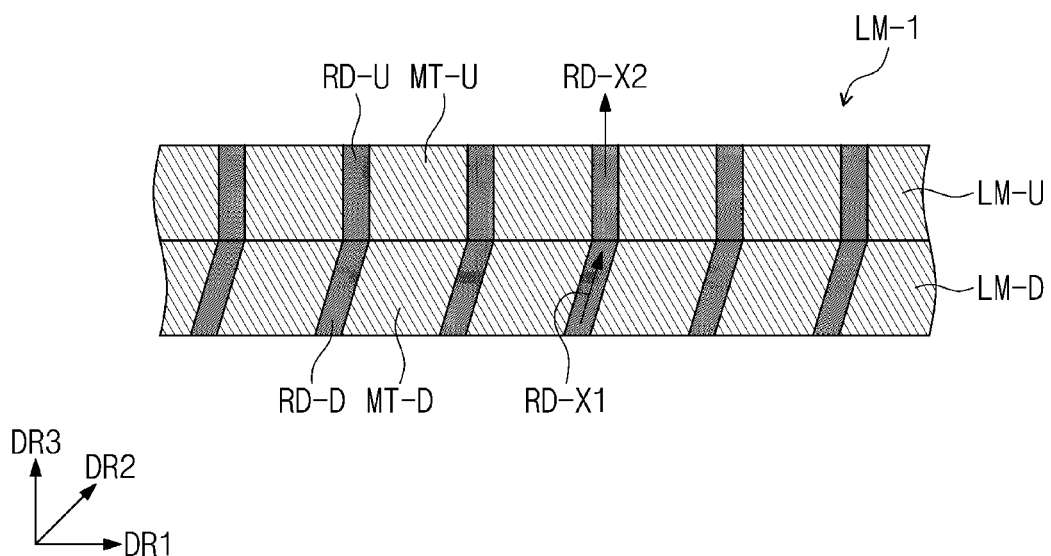
FIGS. 8A and 8B are cross-sectional views illustrating a light control member included in a display device according to an embodiment of the present disclosure.
Figure 8B:
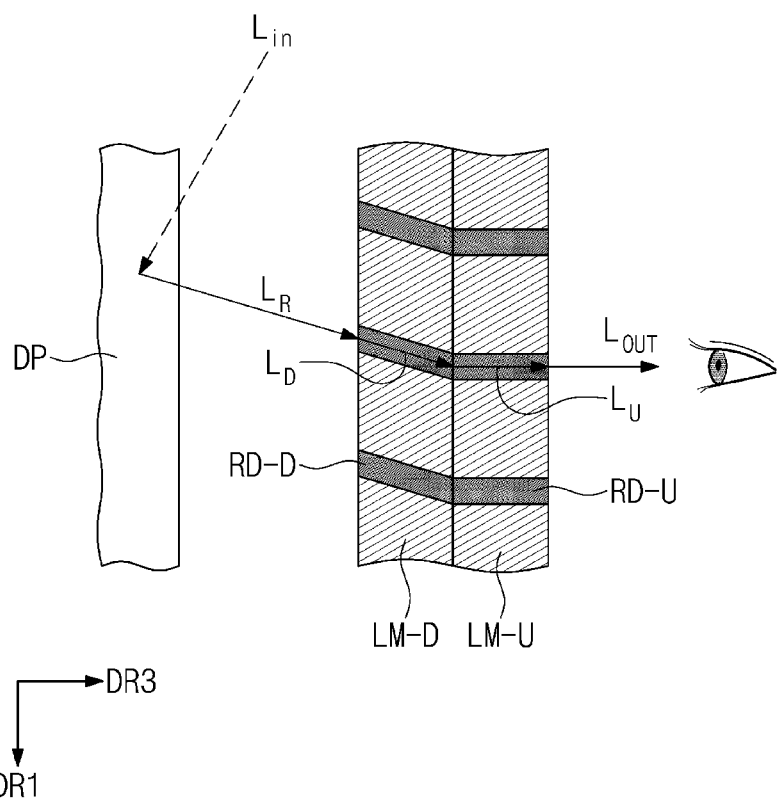

FIG. 8A is a schematic view illustrating a light control member according to another embodiment of the present disclosure. FIG. 8B is a schematic view illustrating a traveling path of light when the light control member according to another embodiment is used.

In an embodiment, a light control member LM-1 may further include an auxiliary light control member LM-U. The auxiliary light control member LM-U may include an auxiliary first optical part RD-U. An extending direction RD-X2 of a long axis of the auxiliary first optical part RD-U may be parallel to a normal direction of a display surface of the liquid crystal display panel. The extending direction RD-X2 of the long axis of the auxiliary first optical part RD-U is herein referred to as 'a fourth alignment direction.' The fourth alignment direction may be parallel to the normal direction of the display surface of the liquid crystal display panel, e.g., a normal direction of an imaginary plane that is defined by the first directional axis DR1 and the second directional axis DR2.

In other words, the auxiliary first optical part RD-U may be aligned in a normal direction of a top surface of the light control member LM-1, and thus light provided from the liquid crystal display panel DP may pass through the light control member LM-1 to be collected or concentrated in the front direction.

The auxiliary light control member LM-U may further include an auxiliary second optical part MT-U that is formed of a material having a lower refractive index than the auxiliary first optical part RD-U. The auxiliary second optical part MT-U may be distinguished from the auxiliary first optical part RD-U. The refractive index of the auxiliary first optical part RD-U may be higher than the refractive index of the auxiliary second optical part MT-U. The auxiliary first optical part RD-U may have a rod shape. The auxiliary second optical part MT-U may fill a space between a plurality of the auxiliary first optical parts RD-U.

The light control member LM-1 illustrated in FIG. 8A may include a plurality of light control layers. Referring to FIGS. 8A and 8B, in an embodiment, the light control member LM-1 may include a base light control member LM-D and the auxiliary light control member LM-U that is disposed on the base light control member LM-D. Here, each of the base light control member LM-D and the auxiliary light control member LM-U may function as a respective light control layer.

The base light control member LM-D may have the same components as the light control member LM of FIGS. 7A and 7B. In other words, the base light control member LM-D may include a base first optical part RD-D and a base second optical part MT-D that are the same as the first optical part RD and the second optical part MT of FIGS. 7A and 7B, respectively. The base first optical part RD-D may be formed of a material having a higher refractive index than the base second optical part MT-D. In addition, the base first optical part RD-D may have a rod shape.

When the base first optical part RD-D is projected on a plane, an extending direction of a long axis of the base first optical part RD-D may correspond to the direction of the first directional axis DR1. In other words, when the base first optical part RD-D is projected on an imaginary plane defined by the first directional axis DR1 and the second directional axis DR2, the extending direction of the long axis of the base first optical part RD-D may be parallel to an alignment direction, in a plan view, of a liquid crystal molecule that is adjacent to an upper substrate of the liquid crystal display panel of the display device using the light control member LM-1. Here, the alignment direction of the liquid crystal molecule in a plan view represents an alignment direction of a long axis of the liquid crystal molecule when the liquid crystal molecule is projected on the imaginary plane defined by the first directional axis DR1 and the second directional axis DR2. The extending direction of the long axis of the base first optical part RD-D that is projected on the imaginary plane may be the same as the alignment direction of the long axis of the liquid crystal molecule that is adjacent to the upper substrate and is projected on the same imaginary plane. Alternatively, the extending direction of the long axis of the base first optical part RD-D that is projected on the imaginary plane may be opposite to the alignment direction of the long axis of the liquid crystal molecule that is adjacent to the upper substrate and is projected on the same imaginary plane, and thus an angle therebetween may be 180 degrees.

Referring to FIG. 8B, incident light $L_{in}$ may be provided from an external light source to the liquid crystal display panel DP, and output light $L_R$ that is generated by and outputted from the liquid crystal display panel DP as an image using the incident light $L_{in}$ may pass through the base first optical part RD-D and the auxiliary first optical part RD-U and then may be transferred as final output light LOUT to a user.

In FIGS. 8A and 8B, the base first optical part RD-D and the auxiliary first optical part RD-U are in contact or coincide with each other. However, embodiments of the present disclosure are not limited thereto. For example, one surface of the base first optical part RD-D that corresponds to an exit surface of light $L_D$ passing through the base light control member LM-D may not contact or coincide with one surface of the auxiliary first optical part RD-U that corresponds to an incident surface of light $L_U$ passing through the auxiliary light control member LM-U.

In an embodiment of the light control member LM-1 of FIGS. 8A and 8B, thicknesses of the base light control member LM-D and the auxiliary light control member LM-U in the direction of the third directional axis DR3 may be equal to or different from each other. The base light control member LM-D and the auxiliary light control member LM-U may be formed of the same material. For example, the base first optical part RD-D and the auxiliary first optical part RD-U may be formed of the same material. Alternatively, the base first optical part RD-D and the auxiliary first optical part RD-U may be formed of different materials from each other.

Figure 9:
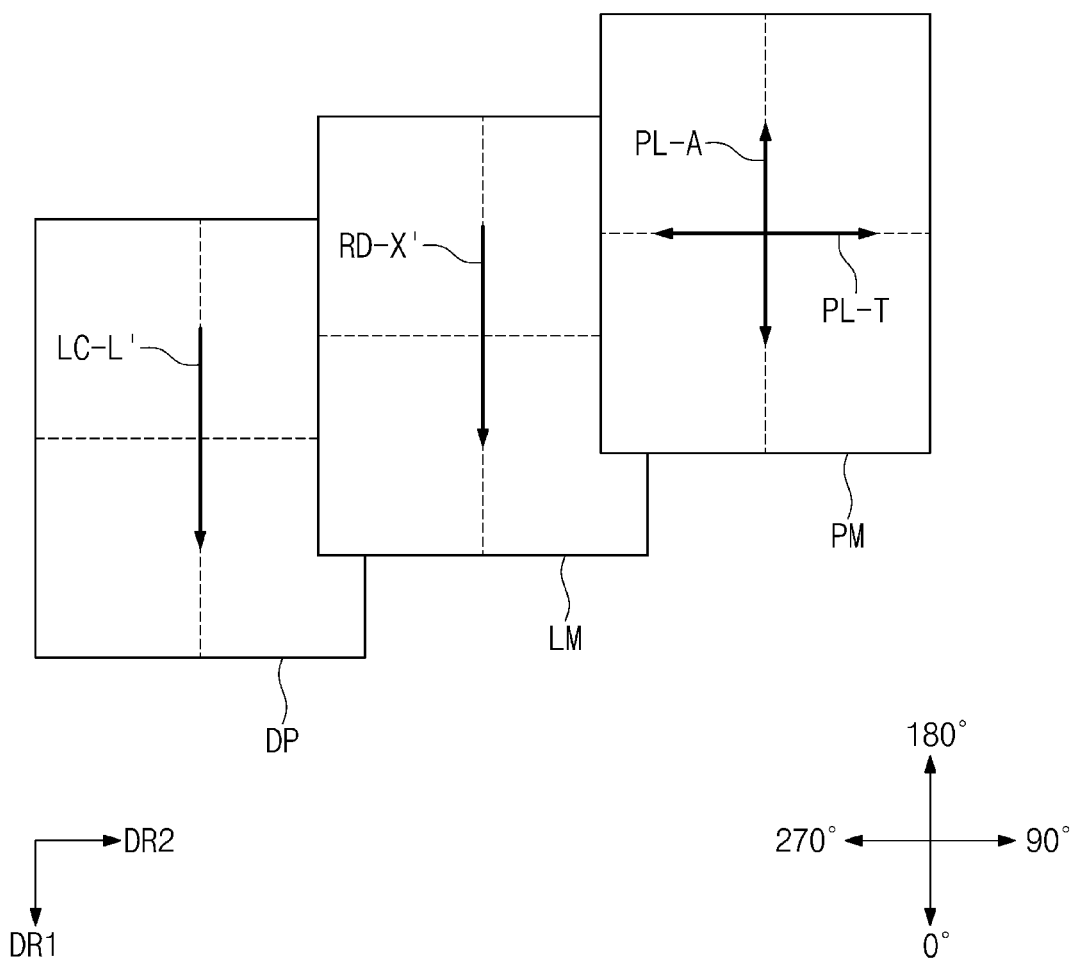
FIG. 9 is a schematic view illustrating relations between an optical axis of a polarizer and alignment directions of a light control member and a liquid crystal molecule in a display device according to an embodiment of the present disclosure.

FIG. 9 is a schematic view illustrating relations between optical axes in a display device according to an embodiment of the present disclosure. The direction of the first directional axis DR1 is 0 degree, and the angle of each of other directions is represented based on the direction of the first directional axis DR1. For example, in the embodiment of FIG. 9, the first directional axis DR1 may be parallel to a vertical side of the liquid crystal display panel DP when the liquid crystal display panel DP is defined as a rectangular shape.

In FIG. 9, an optical axis LC-L' illustrated in the liquid crystal display panel DP represents the first alignment direction of the first liquid crystal molecule LC1 (see FIGS. 3 and 5B), and the first alignment direction may be parallel to the first directional axis DR1 and may have an azimuth of 0 degrees with respect to the first directional axis DR1. Unlike the embodiment of FIG. 9, the azimuth of the first alignment direction may be 180 degrees in another embodiment. The optical axis RD-X' of the light control member LM represents the alignment direction of the first optical part RD (see FIGS. 7A and 7B) of the light control member LM, and the optical axis RD-X' representing the alignment direction of the first optical part RD (see FIGS. 7A and 7B) may represent the extending direction of the long axis of the first optical part RD (see FIG. 7A) that is projected on a plane. The optical axis RD-X' of the light control member LM may be parallel to the first directional axis DR1. The optical axis RD-X' of the light control member LM may have an azimuth of 0 degree with respect to the first directional axis DR1. In other words, the optical axis RD-X' of the light control member LM may be parallel to the optical axis LC-L' of the liquid crystal display panel DP. The azimuth of the optical axis RD-X' of the light control member LM may be substantially equal to the azimuth of the optical axis LC-L' of the liquid crystal display panel DP.

A transmission axis PL-T and an absorption axis PL-A of the polarizing member PM are perpendicular to each other. In the embodiment illustrated in FIG. 9, the transmission axis PL-T may be parallel to the second directional axis DR2 and may be perpendicular to the optical axis RD-X' of the light control member LM and the optical axis LC-L' of the liquid crystal display panel DP. In other words, in an embodiment, the transmission axis PL-T of the polarizing member PM (e.g., the polarizer included in the polarizing member PM) may have an azimuth of 90 degrees. In more detail, in the display device according to an embodiment, the transmission axis PL-T of the polarizer may have the azimuth of 90 degrees with respect to the first directional axis DR1. The optical axis RD-X' of the light control member LM and the optical axis LC-L' of the liquid crystal display panel DP may have the azimuth of 0 degree with respect to the first directional axis DR1. Alternatively, in the display device according to another embodiment, the transmission axis PL-T of the polarizer may have the azimuth of 90 degrees with respect to the first directional axis DR1, the optical axis RD-X' of the light control member LM may have the azimuth of 0 degree with respect to the first directional axis DR1, and the optical axis LC-L' of the liquid crystal display panel DP may have the azimuth of 180 degree with respect to the first directional axis DR1.

In an embodiment, the transmission axis PL-T of the polarizing member PM may be parallel to a horizontal direction of the liquid crystal display panel DP when viewed in a plan view. The horizontal direction of the liquid crystal display panel DP may represent a horizontal direction in the display surface of the liquid crystal display panel DP, on which an image is displayed. In the present specification, the horizontal direction of the liquid crystal display panel or the horizontal direction of the display surface may correspond to a horizontal direction of the display panel in which a user views the display panel.

In an embodiment, the alignment direction of the liquid crystal molecule of the liquid crystal display panel DP including the pixel electrode PE-1 of FIG. 6A may have an azimuth of 0 degree or 90 degrees with respect to the first directional axis DR1. In addition, the optical axis RD-X' of the light control member LM may be parallel or perpendicular to the alignment direction of the liquid crystal molecule. For example, the optical axis RD-X' of the light control member LM may have an azimuth of 0 degree with respect to the first directional axis DR1.

In addition, the transmission axis PL-T of the polarizing member PM of the display device including the pixel electrode PE-1 of FIG. 6A may be parallel to the second directional axis DR2 and may be perpendicular to the optical axis RD-X' of the light control member LM. The transmission axis PL-T of the polarizing member PM may be parallel or perpendicular to the optical axis LC-L' of the liquid crystal display panel DP. In more detail, in an embodiment, the transmission axis PL-T of the polarizer may have an azimuth of 90 degrees with respect to the first directional axis DR1.

In the display device according to an embodiment, the optical axis LC-L' of the liquid crystal display panel DP and the optical axis RD-X' of the light control member LM are parallel to each other, and thus it is possible to minimize or prevent light leakage and color deviation problems that may occur if optical axes of the liquid crystal display panel DP and the light control member LM are offset from each other.

In addition, in the display device according to an embodiment, the transmission axis PL-T of the polarizer included in the polarizing member PM is perpendicular to the optical axis LC-L' of the liquid crystal display panel DP and the optical axis RD-X' of the light control member LM, and thus a contrast ratio and color reproducibility can be increased improving the display quality of the display device.

The transmission axis PL-T of the polarizer of the polarizing member PM has the azimuth of 90 degrees in the embodiment of FIG. 9. Alternatively, the transmission axis PL-T of the polarizer may have an azimuth of 0 degree in another embodiment. In other words, the transmission axis PL-T of the polarizer may be parallel to both the optical axis RD-X' of the light control member LM and the optical axis LC-L' of the liquid crystal display panel DP.

Figure 10A:
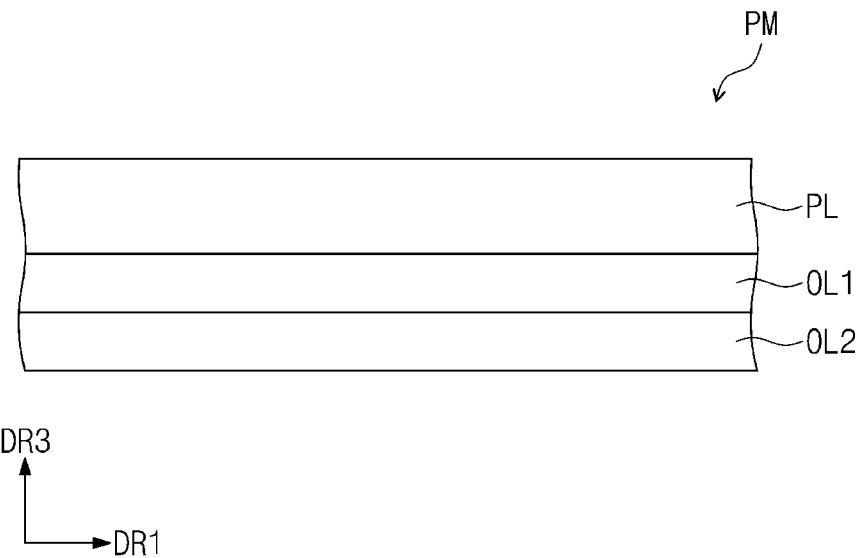
FIG. 10A is a cross-sectional view illustrating a polarizing member according to an embodiment of the present disclosure.
Figure 10B:
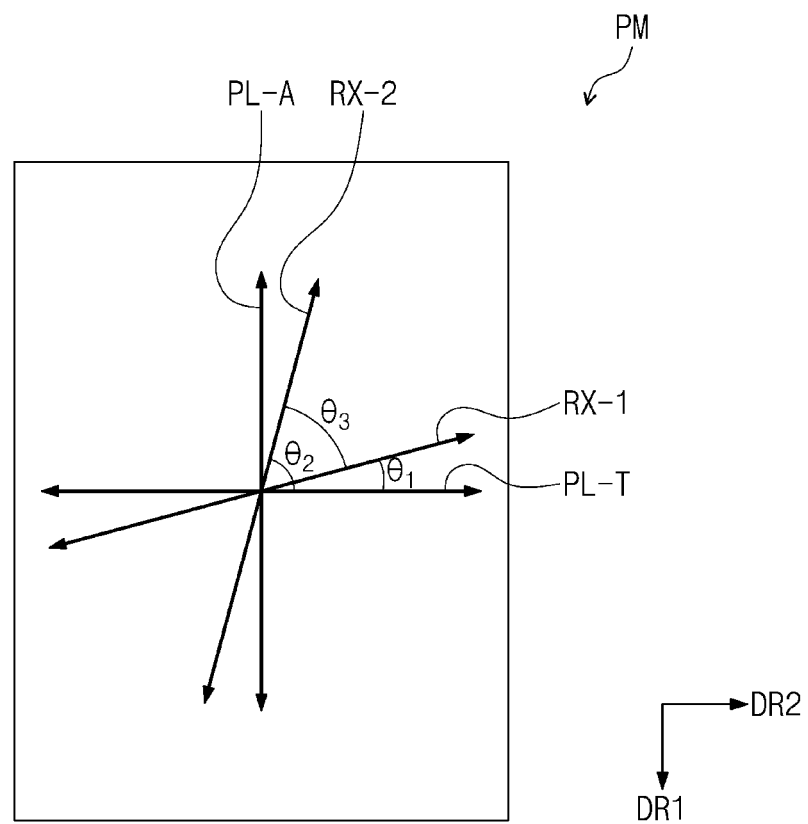
FIG. 10B is a schematic view illustrating relations between optical axes in a polarizing member according to an embodiment of the present disclosure.

A polarizing member used in a display device of an embodiment may include the polarizer and may further include at least one optical layer. FIG. 10A is a cross-sectional view illustrating a polarizing member according to an embodiment, and FIG. 10B is a schematic view illustrating relations between optical axes of a polarizer and optical layers in a polarizing member according to an embodiment.

A polarizing member PM may include a polarizer PL having a transmission axis PL-T and an absorption axis PL-A that are perpendicular to each other. The polarizer PL may be a linear polarizer. The polarizer PL may be a film-type polarizer including an elongated polymer film. Alternatively, the polarizer PL may be a coating-type polarizer formed by a coating process.

The polarizing member PM may further include a $\lambda/2$ phase retardation layer OL1 and a $\lambda/4$ phase (quarter-wave) retardation layer OL2. The a $\lambda/2$ phase retardation layer OL1 may also be referred to as a half-wave retardation layer, and the a $\lambda/4$ phase retardation layer OL2 may also be referred to as a quarter-wave retardation layer. Referring to FIG. 10A, the $\lambda/2$ phase retardation layer OL1 may be disposed under the polarizer PL, and the $\lambda/4$ phase retardation layer OL2 may be disposed under the $\lambda/2$ phase retardation layer OL1.

The $\lambda/2$ phase retardation layer OL1 and the $\lambda/4$ phase retardation layer OL2 may be optical layers that retard a phase of light provided through the polarizer PL. The $\lambda/2$ phase retardation layer OL1 and the $\lambda/4$ phase retardation layer OL2 may be provided in a film type or in a liquid crystal coating type.

The $\lambda/2$ phase retardation layer OL1 may change a polarization state of light provided through the polarizer PL. The $\lambda/2$ phase retardation layer OL1 may chance a polarization direction of linearly polarized light provided through the polarizer PL into the $\lambda/2$ phase retardation layer OL1.

The $\lambda/4$ phase retardation layer OL2 may have optical anisotropy and may change a polarization state of light incident onto the $\lambda/4$ phase retardation layer OL2. In other words, light that is transmitted through the polarizer PL and the $\lambda/2$ phase retardation layer OL1 and incident onto the $\lambda/4$ phase retardation layer OL2 may be changed from a linear polarization state into a circular polarization state.

Alternatively, when circularly polarized light is incident onto the $\lambda/4$ phase retardation layer OL2 in the liquid crystal display panel DP, the $\lambda/4$ phase retardation layer OL2 may chance the circular polarization state of the light into the linear polarization state. The light changed into the linear polarization state through the $\lambda/4$ phase retardation layer OL2 may be reflected by the liquid crystal display panel DP, for example, a reflection layer of the liquid crystal display panel DP, and pass through the $\lambda/2$ phase retardation layer OL1, and thus the polarization state of the light may further be changed. Finally, the light may pass through the polarizer PL to be outputted to the outside of the polarizing member PM.

On the other hand, even though not shown in FIG. 10A, the polarizing member PM may further include an additional optical layer. In addition, a protective member may further be disposed on the polarizing member PM to protect the display device.

FIG. 10B illustrates relations between the transmission axis PL-T and the absorption axis PL-A of the polarizer PL, a first optical axis RX-1 of the $\lambda/2$ phase retardation layer OL1, and a second optical axis RX-2 of the $\lambda/4$ phase retardation layer OL2 of the polarizing member PM. The first optical axis RX-1 of the λ/2 phase retardation layer OL1 and the second optical axis RX-2 of the λ/4 phase retardation layer OL2 may represent a slow axis of the λ/2 phase retardation layer OL1 and a slow axis of the λ/4 phase retardation layer OL2, respectively.

An angle $\theta_1$ between the transmission axis PL-T of the polarizer and the first optical axis RX-1 may be 15°±5°. An angle $\theta_2$ between the transmission axis PL-T of the polarizer and the second optical axis RX-2 may be 75°±5°. An angle $\theta_3$ between the first optical axis RX-1 of the λ/2 phase retardation layer and the second optical axis RX-2 of the λ/4 phase retardation layer may be 60°±5°. For example, the angle $\theta_1$ between the transmission axis PL-T of the polarizer and the first optical axis RX-1 may be 15°, and the angle $\theta_2$ between the transmission axis PL-T of the polarizer and the second optical axis RX-2 may be 75°. In this case, the angle $\theta_3$ between the first optical axis RX-1 and the second optical axis RX-2 may be 60°.

Figure 11:
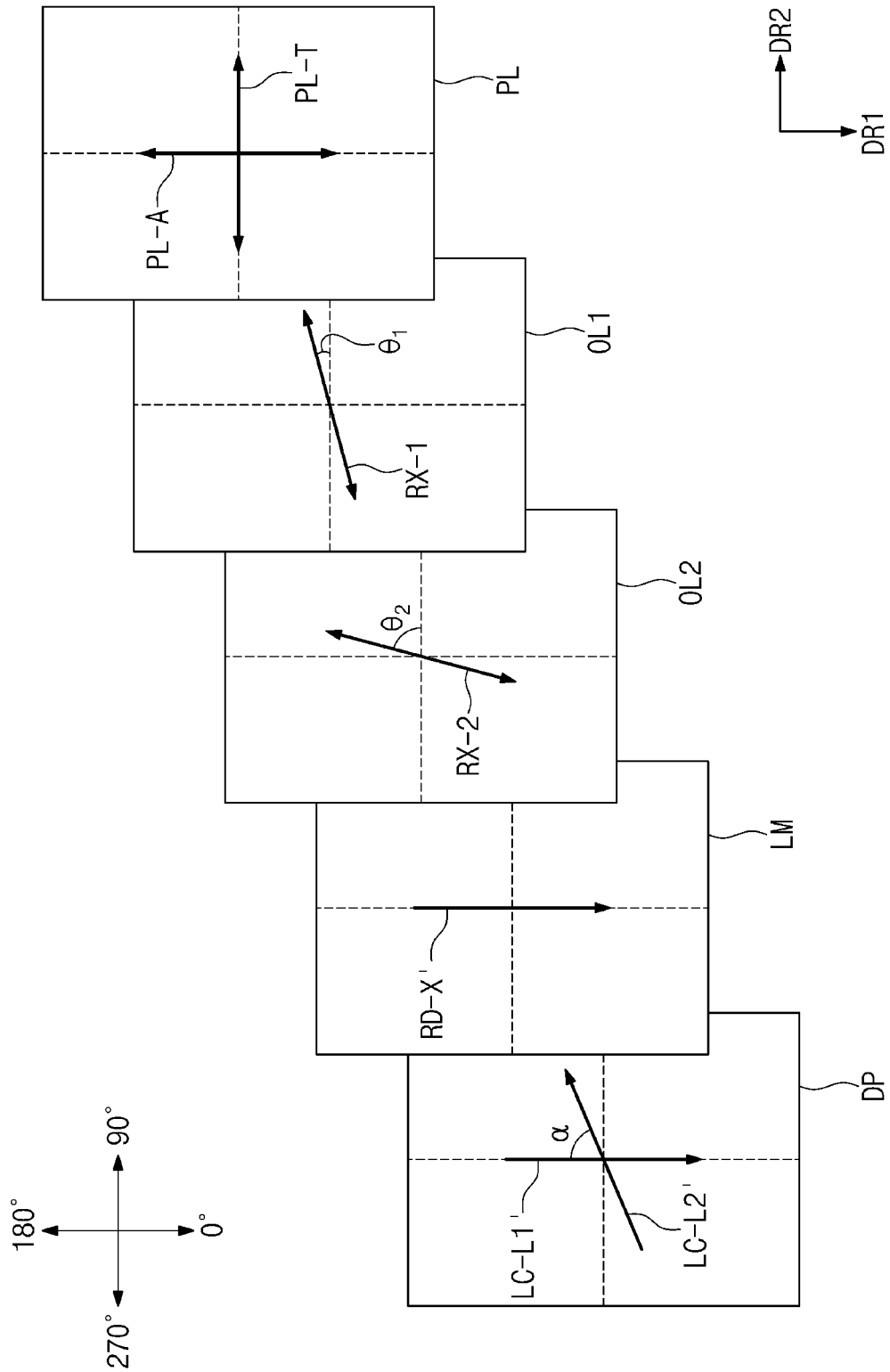
FIGS. 11 and 12 are schematic views illustrating relations between optical axes of a polarizing member and alignment directions of a light control member and a liquid crystal molecule in a display device according to embodiments of the present disclosure.
Figure 12:
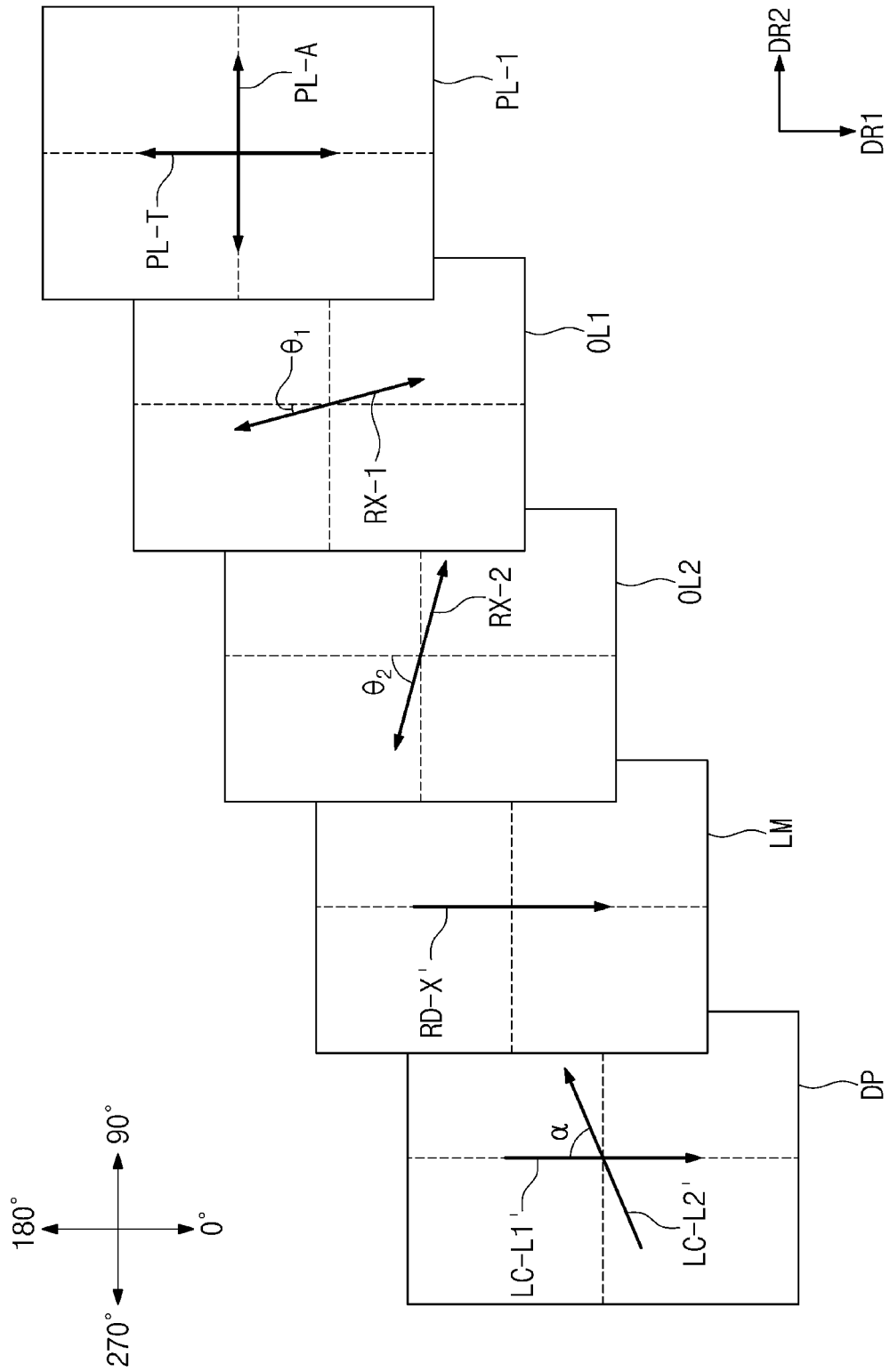

FIGS. 11 and 12 illustrate relations between optical axes in a display device of an embodiment when the polarizing member includes the polarizer PL, the λ/2 phase retardation layer OL1, and the λ/4 phase retardation layer OL2 as shown in FIG. 10.

In FIG. 11, optical axes LC-L1' and LC-L2' of the liquid crystal display panel DP represent the first alignment direction of the first liquid crystal molecule and the second alignment direction of the second liquid crystal molecule, respectively. Referring to FIG. 3, the first alignment direction is the alignment direction of the long axis of the first liquid crystal molecule LC1 that is projected on the first substrate SUB1, and the second alignment direction is the alignment direction of the long axis of the second liquid crystal molecule LC2 that is projected on the second substrate SUB2.

In the liquid crystal display panel DP, the optical axis LC-L1' corresponding to the first alignment direction may be parallel to the first directional axis DR1 and may have an azimuth of 0 degree with respect to the first directional axis DR1. Alternatively, in another embodiment, the first alignment direction may have an azimuth of 180 degrees. An angle α between the optical axis LC-L1' corresponding to the first alignment direction and the optical axis LC-L2' corresponding to the second alignment direction may range from 60 degrees to 90 degrees. Here, the angle α is measured between the optical axis LC-L1' of the first alignment direction and the optical axis LC-L2' of the second alignment direction. The angle α represents an angle of 90 degrees or less among angles formed by two optical axes. The angle α represents the acute angle between the two optical axes. For example, the angle α between the optical axis LC-L1' corresponding to the first alignment direction and the optical axis LC-L2' corresponding to the second alignment direction may be greater than 60 degrees and less than 70 degrees.

The optical axis RD-X' of the light control member LM may represent the alignment direction of the first optical part RD (see FIGS. 7A and 7B) of the light control member LM, and the optical axis RD-X' representing the alignment direction of the first optical part RD (see FIGS. 7A and 7B) may correspond to the extending direction of the long axis of the first optical part RD (see FIGS. 7A and 7B) projected on a plane. The optical axis RD-X' of the light control member LM may be parallel to the first directional axis DR1. The optical axis RD-X' of the light control member LM may have an azimuth of 0 degree with respect to the first directional axis DR1. In other words, the optical axis RD-X' of the light control member LM may be parallel to the optical axis LC-L1' of the first alignment direction of the liquid crystal display panel DP. The azimuth of the optical axis RD-X' of the light control member LM may be substantially equal to the azimuth of the optical axis LC-L1' of the first alignment direction of the liquid crystal display panel DP.

The transmission axis PL-T of the polarizer PL may be parallel to the second directional axis DR2 and may be perpendicular to the optical axis RD-X' of the light control member LM and the optical axis LC-L1' of the first alignment direction of the liquid crystal display panel DP. In other words, in an embodiment, the transmission axis PL-T of the polarizer PL may have an azimuth of 90 degrees. In more detail, in the display device according to an embodiment, the transmission axis PL-T of the polarizer PL may have the azimuth of 90 degrees with respect to the first directional axis DR1, and the optical axis RD-X' of the light control member LM and the optical axis LC-L1' of the first alignment direction of the liquid crystal display panel DP may have the azimuths of 0 degree with respect to the first directional axis DR1.

Referring to FIG. 11, the first optical axis RX-1 of the λ/2 phase retardation layer OL1 forms the angle $\theta_1$ with respect to the transmission axis PL-T of the polarizer PL, and the second optical axis RX-2 of the λ/4 phase retardation layer OL2 forms the angle $\theta_2$ with respect to the transmission axis PL-T of the polarizer PL. The angle $\theta_1$ and the angle $\theta_2$ may be 15°±5° and 75°±5°, respectively, as described above with reference to FIGS. 10A and 10B.

A direction of a transmission axis of a polarizer may be different from the direction of the transmission axis PL-T of the polarizer PL shown in the embodiment of FIG. 11. Referring to FIG. 12, a transmission axis PL-T of a polarizer PL-1 may be parallel to the first directional axis DR1 and may further be parallel to the optical axis RD-X' of the light control member LM and the optical axis LC-L1' of the first alignment direction of the liquid crystal display panel DP. In other words, in an embodiment, the transmission axis PL-T of the polarizer PL-1 may have an azimuth of 0 degrees. In more detail, in the display device according to an embodiment, all of the azimuths of the transmission axis PL-T of the polarizer PL-1, the optical axis RD-X' of the light control member LM and the optical axis LC-L1' of the first alignment direction of the liquid crystal display panel DP may be 0 degree with respect to the first directional axis DR1. Alternatively, in the display device according to another embodiment, the transmission axis PL-T of the polarizer PL-1 and the optical axis RD-X' of the light control member LM may have the azimuths of 0 degree with respect to the first directional axis DR1, and the optical axis LC-L1' of the first alignment direction of the liquid crystal display panel DP may have an azimuth of 180 degrees with respect to the first directional axis DR1.

The following Table 1 shows optical characteristics of the display device according to an embodiment of the present disclosure and a display device according to a comparative example. In more detail, Table 1 shows a white reflectance WR, a black reflectance BR, a contrast ratio, CR, and color reproducibility when each of the display devices of the embodiment and the comparative example is viewed in the front direction.

In Table 1, the embodiment represents a case in which the optical axis of the light control member is parallel to the first alignment direction of the liquid crystal molecule that is adjacent to the upper substrate in the liquid crystal display panel, and the transmission axis of the polarizer is perpendicular to the optical axis of the light control member. In other words, the embodiment of Table 1 shows optical characteristics of the display device having the relations between the optical axes illustrated in FIG. 10.

In Table 1, the comparative example represents a case in which the optical axis of the light control member is not parallel to the first alignment direction of the liquid crystal molecule that is adjacent to the upper substrate in the liquid crystal display panel. In the comparative example, the optical axis of the light control member is perpendicular to the first alignment direction of the liquid crystal molecule that is adjacent to the upper substrate. In other words, in the comparative example, the first alignment direction of the liquid crystal molecule is parallel to the transmission axis of the polarizer.

The white reflectance WR and the black reflectance BR are relative reflectance values when a reflectance of light with respect to a barium sulfate ($BaSO_4$) substrate is 100%.

TABLE 1

| Classification | WR (%) | BR (%) | CR | Color reproducibility (%) |
|---|---|---|---|---|
| Embodiment | 114 | 7 | 16.1 | 19.3 |
| Comparative example | 115 | 11 | 10.0 | 16.7 |

Referring to Table 1, the contrast ratio CR and the color reproducibility of the embodiment in which the optical axis of the light control member is parallel to the direction of the optical axis of the liquid crystal molecule that is adjacent to the light control member are improved as compared with those of the comparative example in which the optical axis of the light control member is not parallel to the direction of the optical axis of the liquid crystal molecule that is adjacent to the light control member.

In the display device according to an embodiment, the optical axis of the light control member that is projected on the plane is parallel to the alignment direction of the liquid crystal molecule that is adjacent to the light control member. Thus, a light distortion phenomenon that may be caused by an alignment direction difference may be minimized reducing a color difference according to a viewing angle and a light leakage phenomenon in the front direction corresponding to a display direction of an image. As a result, the display quality of the display device can be improved.

In addition, the display device according to an embodiment may include the light control member of which the optical axis on the plane is parallel to the alignment direction of the liquid crystal molecule that is adjacent to the light control member, and the polarizing member that has the transmission axis perpendicular to the optical axis of the light control member and the alignment direction of the liquid crystal molecule. Thus, when an image is displayed using the external light, the brightness, the color reproducibility, and the contrast ratio CR in the front direction can be improved, hence improving the overall display quality of the display device.

According to an embodiment, the optical axis of the light control member that is projected on the plane is parallel to the alignment direction of the liquid crystal molecule, and thus the contrast ratio and the color reproducibility of the display device can be improved.

According to an embodiment, the contrast ratio and the color reproducibility of the reflective liquid crystal display device can be improved by controlling or adjusting the relations between the alignment directions of the polarizing member, the light control member, and the liquid crystal molecule.

While the present disclosure has been described with reference to example embodiments, it will be apparent to those skilled in the art that various changes and modifications may be made without departing from the spirits and scopes of the present disclosure. Therefore, it should be understood that the above embodiments are not limiting, but illustrative. Thus, the scopes of the present disclosure are to be determined by the broadest permissible interpretation of the following claims and their equivalents, and shall not be restricted or limited by the foregoing description.

What is claimed is:

1. A display device comprising:
a liquid crystal display panel comprising: a first substrate; a second substrate facing the first substrate and comprising a reflective layer; and a liquid crystal layer disposed between the first substrate and the second substrate, wherein the liquid crystal layer comprises a first liquid crystal molecule adjacent to the first substrate, and wherein a long axis of the first liquid crystal molecule projected on the first substrate is aligned in a first direction;
a light control member disposed on the liquid crystal display panel and comprising a first optical part and an auxiliary optical part, wherein the first optical part comprises a plurality of first rods that extends through a thickness of the first optical part in a first extending direction, the auxiliary optical part comprises a plurality of second rods that extends in a second extending direction that is parallel to a normal direction of a display surface of the liquid crystal display panel,
wherein an extending direction of a long axis of the first optical part projected on the first substrate is parallel to the first direction; and
a polarizing member disposed on the light control member and comprising a polarizer having a transmission axis extending in a second direction.

2. The display device of claim 1, wherein the second direction is perpendicular to the first direction.

3. The display device of claim 1, wherein the second direction is parallel to the first direction.

4. The display device of claim 1, wherein the second direction is parallel to a horizontal direction of the liquid crystal display panel in a plan view, and
wherein the first direction is perpendicular to the second direction.

5. The display device of claim 1, wherein the second direction is perpendicular to a horizontal direction of the liquid crystal display panel in a plan view, and
wherein the first direction is parallel to the second direction.

6. The display device of claim 1, wherein the polarizing member further comprises:
a half-wave retardation layer disposed under the polarizer; and
a quarter-wave retardation layer disposed under the half-wave retardation layer.

7. The display device of claim 6, wherein an angle between a first optical axis of the half-wave retardation layer and a second optical axis of the quarter-wave retardation layer is 60°±5°.

8. The display device of claim 6, wherein an angle between the transmission axis and a first optical axis of the half-wave retardation layer is 15°±5°, and wherein an angle between the transmission axis and a second optical axis of the quarter-wave retardation layer is 75°±5°.

9. The display device of claim 1, wherein the light control member further comprises:
  a plurality of first optical parts having a first refractive index; and
  a second optical part having a second refractive index that is lower than the first refractive index and filling a space between the plurality of first optical parts.

10. The display device of claim 1, wherein the auxiliary optical part is disposed adjacent to the polarizing member.

11. The display device of claim 1, further comprising:
  a first alignment layer disposed between the first substrate and the liquid crystal layer,
  wherein a rubbing direction of the first alignment layer is parallel to the first direction.

12. The display device of claim 11, wherein the rubbing direction of the first alignment layer is parallel or perpendicular to the second direction.

13. The display device of claim 1, wherein the second substrate further comprises a pixel electrode comprising a stem portion and a plurality of branch portions protruding and extending from the stem portion, and
  wherein an extending direction of the plurality of branch portions is parallel to the first direction.

14. The display device of claim 13, wherein the extending direction of the plurality of branch portions is parallel or perpendicular to the second direction.

15. The display device of claim 1, wherein the liquid crystal layer further comprises a second liquid crystal molecule disposed adjacent to the second substrate, and
  wherein an angle between the first direction and an alignment direction of a long axis of the second liquid crystal molecule that is projected on the second substrate ranges from 60 degrees to 90 degrees.

16. The display device of claim 1, wherein the first substrate further comprises a color filter layer.

17. The display device of claim 1, wherein the second substrate further comprises a color filter layer disposed on the reflective layer.

18. A display device comprising:
  a liquid crystal display panel comprising: a first substrate; a second substrate facing the first substrate and comprising a reflective layer; and a liquid crystal layer disposed between the first substrate and the second substrate, wherein the liquid crystal layer comprises a liquid crystal molecule adjacent to the first substrate, and wherein a long axis of the liquid crystal molecule projected on the first substrate is aligned in a first direction;
  a light control member disposed on the liquid crystal display panel and comprising a first optical part and an auxiliary optical part, wherein the first optical part comprises a plurality of first rods that extends through a thickness of the first optical part in a first extending direction, the auxiliary optical part comprises a plurality of second rods that extends from an end of the plurality of first rods through a thickness of the auxiliary optical part in a second extending direction that is different from the first extending direction, and a long axis of the first optical part that is projected on the first substrate is parallel to the first direction; and
  a polarizing member disposed on the light control member and comprising a polarizer having a transmission axis extending in a second direction that is parallel or perpendicular to the first direction.

19. The display device of claim 18, wherein the second direction is parallel to a horizontal direction of a display surface of the liquid crystal display panel when viewed in a plan view.

20. The display device of claim 19, wherein the first direction is perpendicular to the second direction.

21. A display device comprising:
  a reflective liquid crystal display panel comprising: an upper substrate and a lower substrate facing each other; and a liquid crystal layer disposed between the upper substrate and the lower substrate, wherein the liquid crystal layer comprises a liquid crystal molecule being adjacent to the upper substrate and having a first azimuth;
  a light control member disposed on the reflective liquid crystal display panel and comprising a plurality of first rods having a second azimuth and extending in a first extending direction and a plurality of second rods extending in a second extending direction that is parallel to a normal direction of a display surface of the reflective liquid crystal display panel, and a direction of the second azimuth is parallel to a direction of the first azimuth; and
  a polarizing member disposed on the light control member and comprising a polarizer having a transmission axis extending in a direction perpendicular to the direction of the first azimuth.

22. The display device of claim 21, wherein the second azimuth is equal to the first azimuth.

* * * * *